United States Patent
Fuller et al.

(10) Patent No.: US 12,235,809 B1
(45) Date of Patent: *Feb. 25, 2025

(54) EFFICIENT DATA BACKUP IN A DISTRIBUTED STORAGE SYSTEM

(71) Applicant: Google LLC, Mountain View, CA (US)

(72) Inventors: Alfred R. K. Fuller, San Carlos, CA (US); Arie Ozarov, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,755

(22) Filed: Sep. 8, 2023

Related U.S. Application Data

(63) Continuation of application No. 17/843,268, filed on Jun. 17, 2022, now Pat. No. 11,809,385, which is a continuation of application No. 14/051,420, filed on Oct. 10, 2013, now Pat. No. 11,392,557.

(60) Provisional application No. 61/714,136, filed on Oct. 15, 2012.

(51) Int. Cl.
*G06F 16/21* (2019.01)
(52) U.S. Cl.
CPC .................................. *G06F 16/21* (2019.01)
(58) Field of Classification Search
CPC ........................................................ G06F 16/21
See application file for complete search history.

(56) References Cited

U.S. PATENT DOCUMENTS

| | | | |
|---|---|---|---|
| 7,725,669 B1* | 5/2010 | Bingham | G06F 11/1464 711/161 |
| 8,577,842 B1 | 11/2013 | Nagargadde et al. | |
| 2010/0030826 A1* | 2/2010 | Kohno | G06F 11/2038 707/E17.005 |
| 2011/0282842 A1 | 11/2011 | Popovski et al. | |
| 2012/0123999 A1* | 5/2012 | Ashutosh | G06F 16/128 707/618 |
| 2013/0132346 A1 | 5/2013 | Varadarajan | |
| 2014/0101108 A1* | 4/2014 | Stewart | G06F 11/1471 707/649 |
| 2014/0108348 A1 | 4/2014 | Ahrens et al. | |

* cited by examiner

*Primary Examiner* — Courtney Harmon
(74) *Attorney, Agent, or Firm* — Lerner David LLP

(57) ABSTRACT

A method and a server system for creating consistent snapshots in a distributed storage system are disclosed. The server system stores entities in databases that includes a production portion for storing current versions of entities and a backup portion for storing backup versions of modified entities, receives a request for a snapshot of a portion of the databases at a predefined snapshot time. In response to the request, the server system generates a snapshot of the databases, the snapshot including: a backup version of an entity retrieved from the backup portion and a current version of another entity retrieved from the databases and produces a response to the request based on the snapshot. When there are several backup portions, a backup portion may be used separately or in conjunction with other backup portions to provide required backup versions to generate a snapshot.

20 Claims, 19 Drawing Sheets

EFFICIENT DATA BACKUP IN A DISTRIBUTED STORAGE SYSTEM

CROSS-REFERENCE TO RELATED APPLICATIONS

This application is a continuation of U.S. patent application Ser. No. 17/843,268, filed Jun. 17, 2022, which is a continuation of U.S. patent application Ser. No. 14/051,420, filed Oct. 10, 2013, now U.S. Pat. No. 11,392,557, which claims the benefit of the filing date of U.S. Provisional Patent Application No. 61/714,136, filed Oct. 15, 2012, the disclosures of which are incorporated herein by reference.

BACKGROUND OF THE INVENTION

Every day, millions of database backup operations are carried out. During a database backup operation, copies of entities in a database are created and stored. A backup of an entire database is sometimes created by creating and storing copies of each and every entity in the database when a backup is requested. However, this approach frequently results in an inefficient use of storage space, because entities which have not been modified since the last backup operation are nevertheless duplicated when generating a new backup. Additionally, large databases are sometimes distributed over a number of different datacenters or storage systems.

SUMMARY

The disclosed embodiments relate generally to the field of distributed storage systems, and in particular, to a system and method for efficient data backup in a distributed storage system. For databases that store a large number of entities, the process of creating and storing copies of each and every entity in a database can be both time-consuming and storage space-consuming. Additionally, it can be difficult to create a consistent point in time backup of a distributed database. In particular, when a large database is distributed over a number of different datacenters or storage systems, it is frequently the case that making a copy of all of the data in the database would take a non-trivial amount of time. In such circumstances, placing the database into a read-only mode when a backup is performed would substantially degrade the usability of the database. One option is to generate backup versions of entities as the entities are modified or deleted rather than copying all of the data in the database for each backup of the distributed database. However, when the database is distributed over a number of different datacenters or storage systems, it can be difficult to coordinate timing of generating these backup versions between the different datacenters or storage systems so as to ensure that the backup versions correspond to a consistent point in time backup of the distributed database (e.g., a consistent "snapshot" of the data in database that was stored at a specific point in time). These and other problems with conventional approaches to backing up data in a distributed storage system are reduced or eliminated by the system and method described below.

In many situations, it would be advantageous to provide a system and method that avoids storing duplicated backup versions, and yet reliably maintains backup versions that are necessary to database snapshots requested by either a client or another server. In particular, an approach that selectively stores backup versions of entities in the databases (e.g., by storing backup versions only for entities which have been modified), and generates database snapshots partially using production data (thus avoiding duplicating production data in backup portion(s)) can provide many of the benefits of consistent database snapshots in a distributed system, without the attendant cost of increasingly inefficient use of storage space.

In some embodiments, a method is performed at a server system having one or more processors and memory storing one or more programs for execution by the one or more processors so as to perform the method. The method includes storing a plurality of entities in one or more databases that include a production portion for storing current versions of entities, and a backup portion for storing backup versions of modified entities. The method further includes receiving a request for a snapshot of at least a portion of the one or more databases at a predefined snapshot time, and in response to the request, generating a snapshot of the one or more databases, which includes: a backup version of a first entity retrieved from the backup portion, and a current version of a second entity retrieved from the production portion. The method further includes producing a response to the request based on the snapshot.

In some embodiments, the method optionally includes: at a time prior to the snapshot time, storing a snapshot timestamp corresponding to the snapshot time; and at a time after the snapshot time receiving a request to modify a respective entity stored at the respective server system, where the respective entity was last modified prior to the snapshot time. The method further optionally includes, in response to the request to modify the respective entity, storing a backup version of the respective entity in the backup portion of the one or more databases, and modifying the respective entity in the production portion of the one or more databases.

In accordance with some embodiments, a computer system (e.g., a client system or server system) includes one or more processors, memory, and one or more programs. The one or more programs are stored in memory and configured to be interpreted or executed by the one or more processors and the one or more programs include instructions for performing the operations of the method described above. In accordance with some embodiments, a non-transitory computer readable storage medium has stored therein instructions which when interpreted or executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the "second entity" are renamed consistently. The first entity and the second entity are both entities in one or more databases, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of selectively storing backup versions of entities that have been modified, so as to efficiently utilize the storage space in a distributed storage system.

Figure 1:
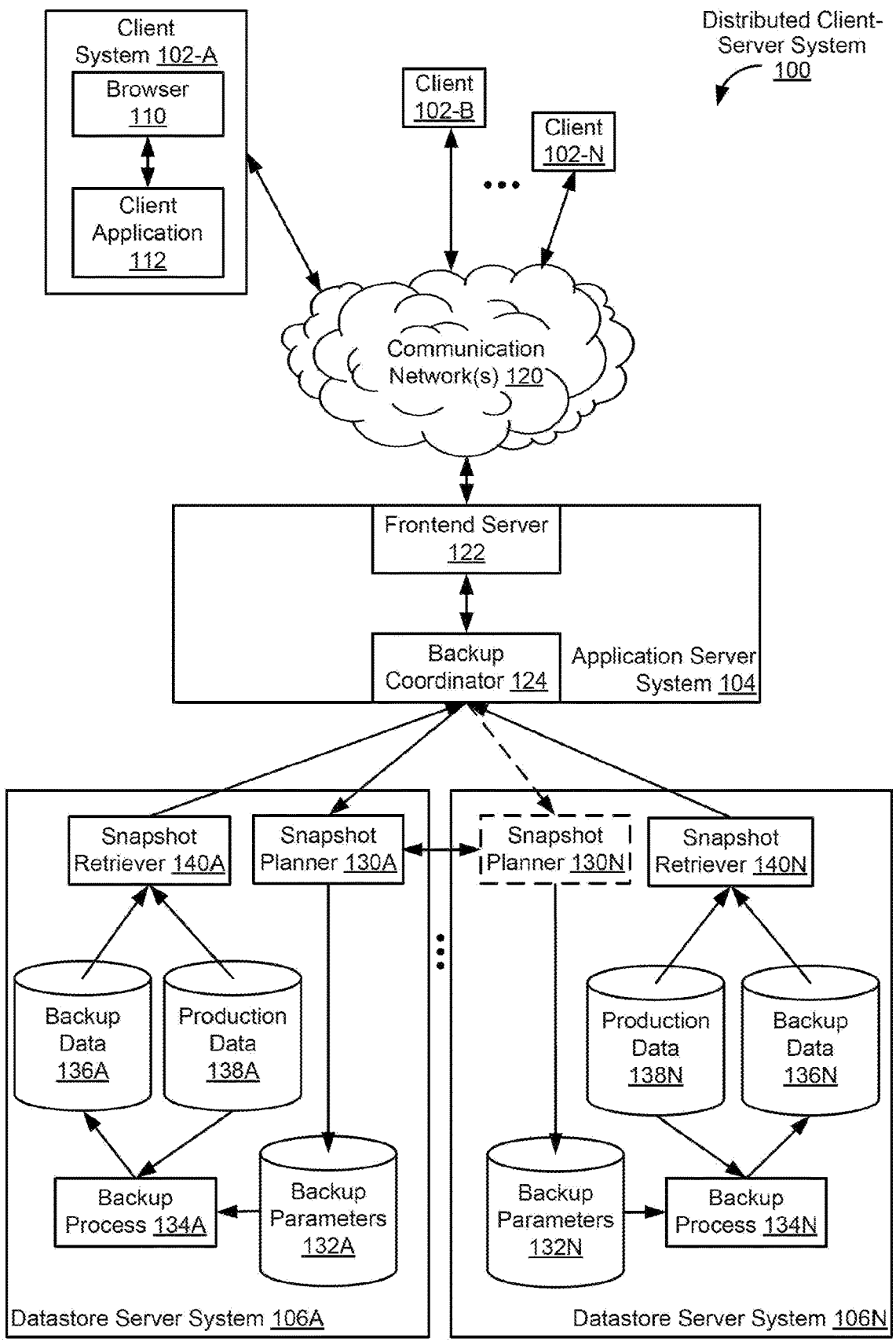
FIG. 1 is a block diagram illustrating a distributed client-server system, in accordance with some embodiments.

FIG. 1 includes a block diagram illustrating an example distributed client-server system 100 for storing and generating database snapshots. The Distributed Client-Server System 100 includes one or more Client System(s) 102-A, 102-B . . . 102-N (a representative of which is referred to herein as "Client 102"), Application Server System 104 (also referred to herein as "Application Server 104"), one or more Datastore Server System(s) 106A . . . 106N (a representative of which is referred to herein as "Datastore Server 106"), and a Communication Network 120 for connecting Clients 102 to Application Server 104. Communication Network 120 optionally includes the Internet, one or more local area networks (LANs), one or more wide area networks (WANs), other types of networks, or a combination of such networks.

In some embodiments, Client 102 includes Browser 110 and Client Application 112. In some embodiments, Browser 110 is a general purpose Internet browser (sometimes called a Web browser) having a browser window used for displaying an interface through which a user can submit requests, such as a request to store a database snapshot, or a request for a database snapshot, to Datastore Server 106, as well as displaying entity values included in a database snapshot. A web application user interface is optionally implemented using hypertext markup language (HTML) or extensible markup language (XML) elements that are rendered by Browser 110. Alternatively, requests are submitted via stand-alone Client Application 112. After a user request is submitted through Browser 110 or the stand-alone Client Application 112, it is transmitted, via Communication Network 120, to Application Server 104. Alternatively, in some embodiments, a user request is submitted from Client 102 directly to Datastore Server 106, and Backup Coordinator 124 is included as part of Datastore Server 106.

In some embodiments, Application Server 104 identifies one or more Datastore Servers 106 where entities relevant to the request are stored, and relays the request to the identified one or more Datastore Servers 106. After receiving a response to the request, Application Server 104 transfers the results including representations of the relevant entities and, optionally, a set of display information back to Client 102. Client Application 112 and/or Browser 110 uses the database snapshots, and displays information received to render a set of search results at Client 102.

In some embodiments, Application Server 104 includes Frontend Server 122, and Backup Coordinator 124. Frontend Server 122 relays a user request received from Client 102 to Backup Coordinator 124, which further transmits the user request to Snapshot Planner 130 in Datastore Server 106. After the user request is fulfilled, Backup Coordinator 124 receives results from Snapshot Retriever 140, and relays the results back to Frontend Server 122, where the results are further transmitted, via Communication Network 120, to Client 102.

In some embodiments, Datastore Server 106 includes Snapshot Planner 130, Backup Parameters 132, Backup Process 134, Backup Data 136, Production Data 138, and Snapshot Retriever 140. After receiving a request from Backup Coordinator 124, Snapshot Planner 130 identifies entities that are relevant to the request, as well as snapshot timestamp associated with the request. Backup Parameters 133 include snapshot timestamps received from Snapshot Planner 130, and locations of entities' backup versions and current version. In accordance with Backup Parameters 133, Backup Process 134 generates backup versions of entities in Production Data 138, and stores Backup Data 136 including one or more backup versions. Backup Data 136 includes backup versions of entities. Production Data 138 includes current versions (e.g., production versions) of entities. Snapshot Retriever 140 generates or retrieves database snapshots, based on data received from both Backup Data 136 and Production Data 138. After database snapshots are generated, Snapshot Retriever 140 transmits these database snapshots to Backup Coordinator 124 in Application Server 104.

In some embodiments, where entities are stored across multiple Datastore Servers 106 (e.g., Datastore Servers 106A . . . 106N), as opposed to on one single Datastore Server 106, Backup Coordinator 124 coordinates between the multiple Datastore Servers 106 by identifying which Datastore Server(s) 106 contain versions of entities relevant to a specific request, and, optionally, relays the request to the identified Datastore Server(s) 106. In some embodiments, a user request is relayed by one Datastore Server 106 to another Datastore Server 106. For example Snapshot Planner 130A generates instructions for backup versions of entities to be stored and distributes these instructions to Datastore Server System 106N (e.g., by transmitting a backup timestamp to Snapshot Planner 132N and/or storing the backup timestamp in Backup Parameters 132N and 132A). In some embodiments, Backup Coordinator 124 receives different portions of a database snapshot from different Datastore Servers 106, and assembles these portions together to generate a complete database snapshot.

In some embodiments, each Datastore Server 106 includes a separate Snapshot Planner 130, and Snapshot Planners 130 in different Datastore Servers 106 communicate with each other, for example, by relaying a request received by one Snapshot Planner in one Datastore Server (e.g., Snapshot Planner 130A in Datastore Server 106A) to another Snapshot Planner in another Datastore Server (e.g., Snapshot Planner 130N in Datastore Server 106N). In some embodiments, Snapshot Planners 130 in different Datastore Servers 106 exchange snapshot timestamps so as to coordinate backups across multiple Datastore Servers 106. For example, when a backup is requested at a backup time, a backup timestamp corresponding to the backup time is distributed to multiple different Datastore Servers 106 prior to the backup time so that all of the multiple Datastore Servers 106 to which the backup timestamp was distributed can start storing backup versions of entities at the backup time.

Figure 2:
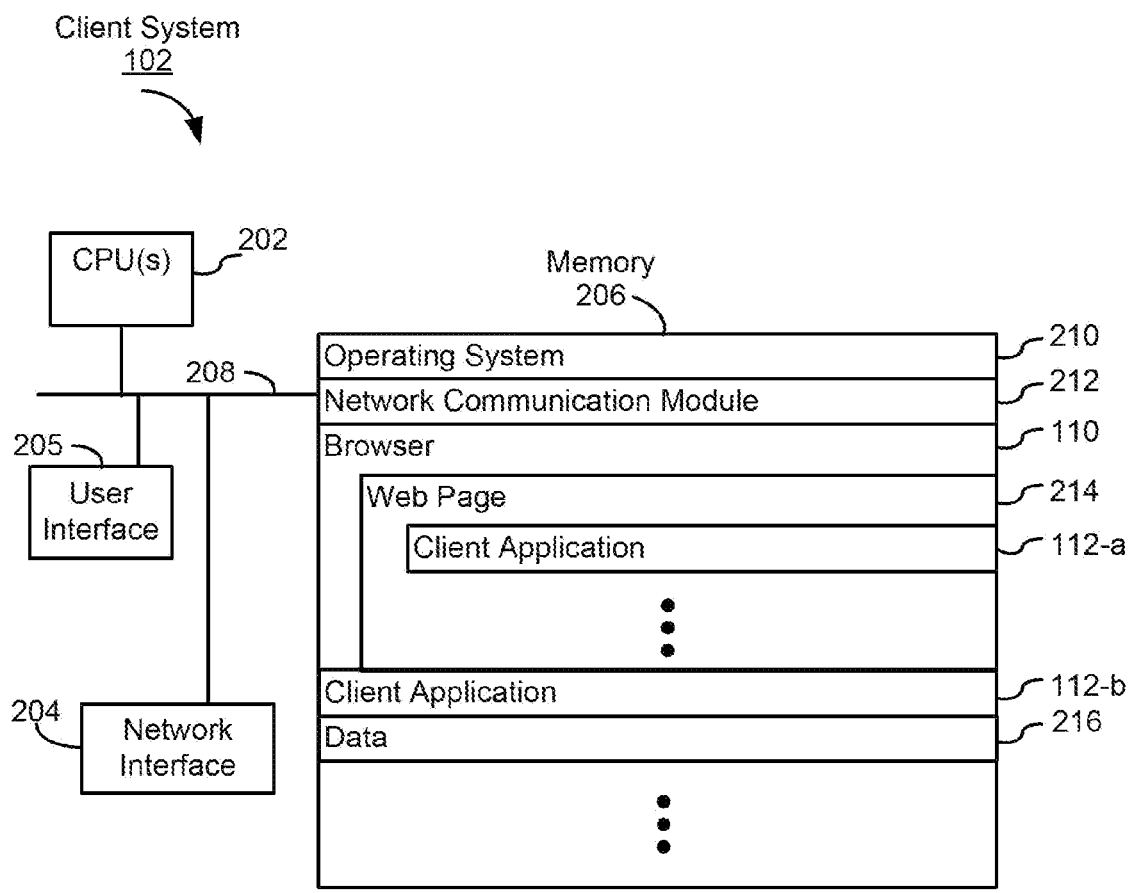
FIG. 2 is a block diagram illustrating a client system, in accordance with some embodiments.

FIG. 2 is a block diagram illustrating Client 102 in accordance with some embodiments. Client 102 typically includes one or more processing units CPU(s) 202 (also herein referred to as processor(s)), one or more Network Interfaces 204, Memory 206, User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212 for connecting Client 102 to other computers (e.g., Application Server 104 or Datastore Server 106) via one or more Network Interfaces 204 (wired or wireless) and one or more Communication Networks 120 (FIG. 1), such as the Internet, other wide area networks, local area networks, metropolitan area networks, and so on;
- Web Browser 110 for loading web pages such as Web Page 214, which optionally includes code for executing Client Application 112-*a* as an embedded application in Web Page 214, where Client Application 112-*a* sends requests to Application Server 104 and displays data received from Application Server 104;
- Client Application 112-*a* for transmitting snapshot requests to Datastore Server 106 and displaying database snapshots received from Application Server 104;
- Client Application 112-*b* (e.g., a stand-alone client application) for transmitting snapshot requests to Datastore Server 106 and displaying database snapshots received from Application Server 104; and
- optionally, Data 216 includes cached data (e.g., recently accessed entities, recently received database snapshots, etc.) corresponding to one or more requests to generate or retrieve snapshots of data stored at Datastore Server 106.

In some of the implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus, in some embodiments, various subsets of these modules are combined or otherwise re-arranged in various embodiments. In some embodiments, Memory 206 optionally stores a subset of the modules and data structures identified above. Furthermore, in some implementations, Memory 206 stores additional modules and data structures not described above.

Figure 3:
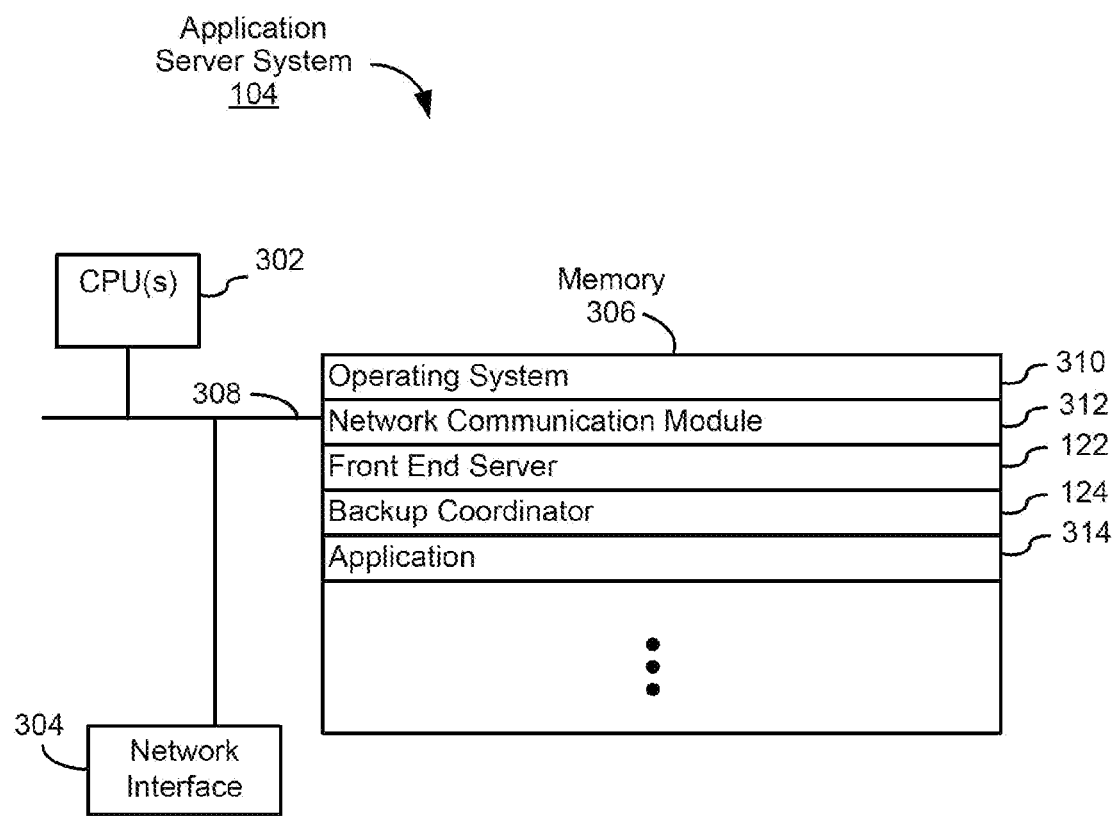
FIG. 3 is a block diagram illustrating an application server system, in accordance with some embodiments.

FIG. 3 is a block diagram illustrating Application Server System 104 ("Application Server 104") in accordance with some embodiments. In some embodiments, Application Server 104 includes one or more processing units CPU(s) 302 (also herein referred to as processor(s)), one or more network or other Communications Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312 for connecting Application Server 104 to other computers (e.g., Client 102 or Datastore Server 106) via one or more Network Interfaces 304 (wired or wireless) and/or one or more Communication Networks 102 (FIG. 1), such as the Internet, other wide area networks, local area networks, metropolitan area networks, and so on;
- Frontend Server 122 for coordinating communications between Application Server 104, Client 102 and any other computer systems with which Application Server 104 communicates;
- Backup Coordinator 124 for coordinating between Application Server 104 and one or more Datastore Servers 106, for example, relaying a request to store a database snapshot received from Client 102 to Datastore Sever 106, and receiving database snapshots, or portions thereof, from one or more Datastore Servers 106; and
- Application 314 for communicating with Client 102 and Datastore Server 106, and optionally serving as an intermediary backend application for a client application at Client 102.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus, in some embodiments, various subsets of these modules are combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which, in some embodiments, are present in a set of servers, than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement one Application Server 104 and how features are allocated among them will vary from one implementation to another, and optionally depends in part on the amount of data traffic that the system must handle during peak usage periods as well as during average usage periods.

Figure 4:
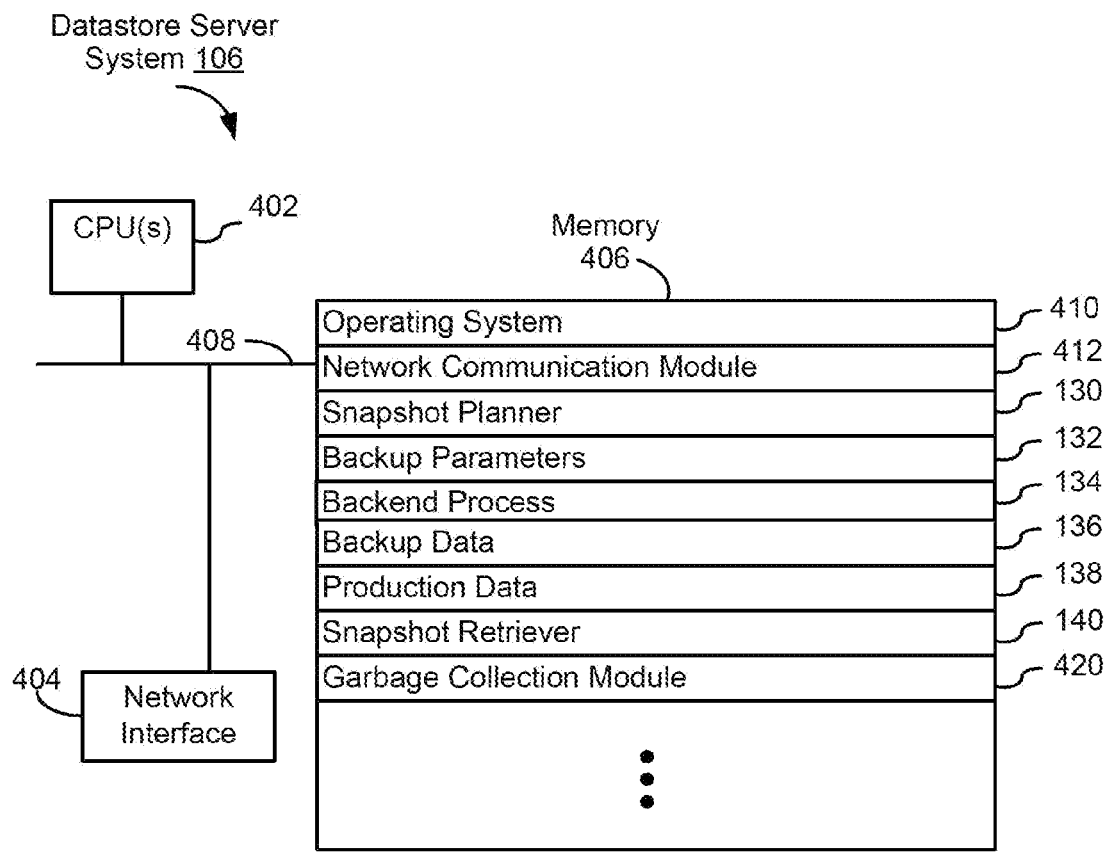
FIG. 4 is a block diagram illustrating a datastore server system, in accordance with some embodiments.

FIG. 4 is a block diagram illustrating Datastore Server 106 in accordance with some embodiments. In some embodiments, Datastore Server 106 includes one or more processing units CPU(s) 402 (also herein referred to as processor(s)), one or more network or other Communications Interfaces 404, Memory 406, and one or more Communication Buses 408 for interconnecting these components. Communication Buses 408 optionally include circuitry (sometimes called a chipset) that interconnects and controls communications between system components.

Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

- Operating System 410 that includes procedures for handling various basic system services and for performing hardware dependent tasks;
- Network Communication Module (or instructions) 412 for connecting Datastore Server 106 to other computers (e.g., Client 102 or Application Server 104) via one or more Network Interfaces 404 (wired or wireless) and one or more Communication Networks 102 (FIG. 1), such as the Internet, other wide area networks, local area networks, metropolitan area networks, and so on;
- Snapshot Planner 130 for storing information associated with a request received from Application Server 104 (e.g., snapshot timestamp included in a request to store a database snapshot) in Backup Parameters 132, and optionally distributing the request further to other Datastore Servers 106;
- Backup Parameters 132 for including snapshot timestamps received from Snapshot Planner 130, and, optionally, information corresponding to locations of entities' backup versions and current version for use in determining whether or not to store a backup version of an entity when an entity is modified or deleted;
- Backup Process 134 for, in accordance with Backup Parameters 132 (e.g., snapshot timestamps), generating backup versions of entities stored in Production Data 138, and storing these backup versions in Backup Data 136;
- Backup Data 136 for storing backup versions of entities created by Backup Process 134; optionally, Backup Data 136 stores other information associated with a backup version, for example, snapshot identifiers, or backup timestamps and garbage-collection timestamps;
- Production Data 138 for storing current version (e.g., production version) of entities; in some embodiments, because the current versions of entities, representing the most recent values of those entities, are stored in the production portion of the databases, the phrase "current versions" and the phrase "production versions" are used interchangeably to refer to the most recent values of entities;
- Snapshot Retriever 140 for generating or retrieving a database snapshot or a portion thereof, by selectively merging production versions of entities stored in Production Data 138 with backup versions stored in Backup Data 136, and transmitting the database snapshot, or a portion thereof, to Backup Coordinator 124 in Application Server 104; and
- optionally, Garbage Collection Module 420 for selectively deleting, or marking for deletion, backup versions of entities that are no longer needed to produce snapshots of data.

In some of the implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus, in some embodiments, various subsets of these modules are combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which, in some embodiments, are present in a set of servers, than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server 106 and how features are allocated among them will vary from one implementation to another, and optionally depends in part on the amount of data traffic that the system must handle during peak usage periods as well as during average usage periods.

Request to Store Snapshot and Request for Snapshot

In some embodiments, a database snapshot includes a collection of values of entities as they existed at the time indicated in the snapshot timestamp. In some embodiments, generating the database snapshot includes copying relevant versions of entities from various portions of one or more databases, and storing these relevant versions independently from the production portion of the one or more databases as a backup so that a snapshot of the one or more databases can be generated using backup versions of entities from the backup.

In some embodiments, a request to store a database snapshot that includes a snapshot time is received prior to the snapshot time. The snapshot time, a time represented by a snapshot timestamp, is stored, and backup versions of modified entities are stored in accordance with the snapshot time in such a way that a "virtual" snapshot of the set of one or more databases as they existed at the snapshot time can be reconstructed after the fact (e.g., after receiving a subsequent request for the database snapshot). In some embodiments, a complete database snapshot is not generated after receiving a request to store a database snapshot (e.g., by copying all of the relevant data from the production portion of the one or more databases into the backup portion of the one or more database). Rather, relevant versions of entities are identified as associated with that particular database snapshot (for example, by way of snapshot identifier or backup timestamp and/or garbage-collection timestamp) such that they can be copied into the backup portion as the entities are modified or deleted from the production portion.

In some embodiments, a complete database snapshot is generated in response to receiving a request to retrieve the database snapshot. In particular, in some situations (e.g., where some but not all of the entities associated with the database snapshot have been modified or deleted since the snapshot time) the complete database snapshot is generated by selectively retrieving from the one or more databases both: backup versions of entities from backup portion(s) of the one or more databases, and current versions of entities from production portion of the databases. In some embodiments, after receiving a request for the database snapshot from a requestor, e.g., Client 102 or Datastore 106, the database snapshot is generated and/or retrieved and transmitted to the requestor.

Entity Value Changes Over Time

The upper portions of FIGS. 5A-5E shares one same example of how values of entities change over time. T1, T2, T3 and T4 represent different points of time in the past at which entities A, B, C, D, E and F were either first created or had their values modified. T5 represents a point of time at which the current versions of entities A, B, C, D, E and F in the production portion carry values A3, B3, C3, D6, E7, and F2, respectively. STS1 represents a time between T1 and T2; STS2 represents a time between T3 and T4; and STS3 represents a time between T4 and T5. Snapshot 1, 2 and 3 are database snapshots, which include a collection of values of entities as they existed at times: STS1, STS2, and STS3, respectively. In some embodiments, requests to store database snapshots are received before the time indicated in the snapshot timestamp. For example, the request to store Snapshot 2 at STS2 is distributed to a plurality of different Datastore Servers 106 before STS2 (e.g., at Time=T3 or Time=T2) so that the plurality of different Datastore Servers 106 can coordinate generating Snapshot 2 by starting to store backup versions for entities for Snapshot 2 that are changed after STS2.

In the example shown in the upper portions of FIGS. 5A-5E, entity A's value was A1 at time T1, was changed to A2 at time T4, and was changed to A3 at time T5. Entity B's value was B1 at time T2, was changed to B2 at time T2, and was changed to B3 at time T5. Entity C's value was C1 at time T1, was changed to C2 at time T3, and was changed to C2 at time T5. Entity D's value was D5 at time T1, and was changed to D2 at time T2; D2 continues to be entity D's value at T5. Entity E's value was E3 at time T1, was changed to E4 at time T2, was changed to E5 at time T3, was changed to E6 at time T4, and was changed to E7 at time T5. Entity F's value was F2 at time T2, which continues to be entity F's value at time T5. In the production portion of the one or more databases, at time T5, the values of entities A, B, C, D, E and F are A3, B3, C3, D6, E7, and F2, respectively.

FIGS. 5A-5E illustrate various different approaches to generating database snapshots. However, the various different approaches share a common structure for generating a respective database snapshot corresponding to a respective snapshot timestamps. Backup versions of entities that have changed between the time of the respective snapshot timestamp and the current time are retrieved from one or more backup portions and current versions of entities that have not changed between the time of the respective snapshot timestamp and the current time are retrieved from the production portion. The backup versions of entities and the current versions of entities are merged to generate a database snapshot corresponding to the respective snapshot timestamp.

Snapshots Generated from Single Independent Backup Portion

Figure 5A:
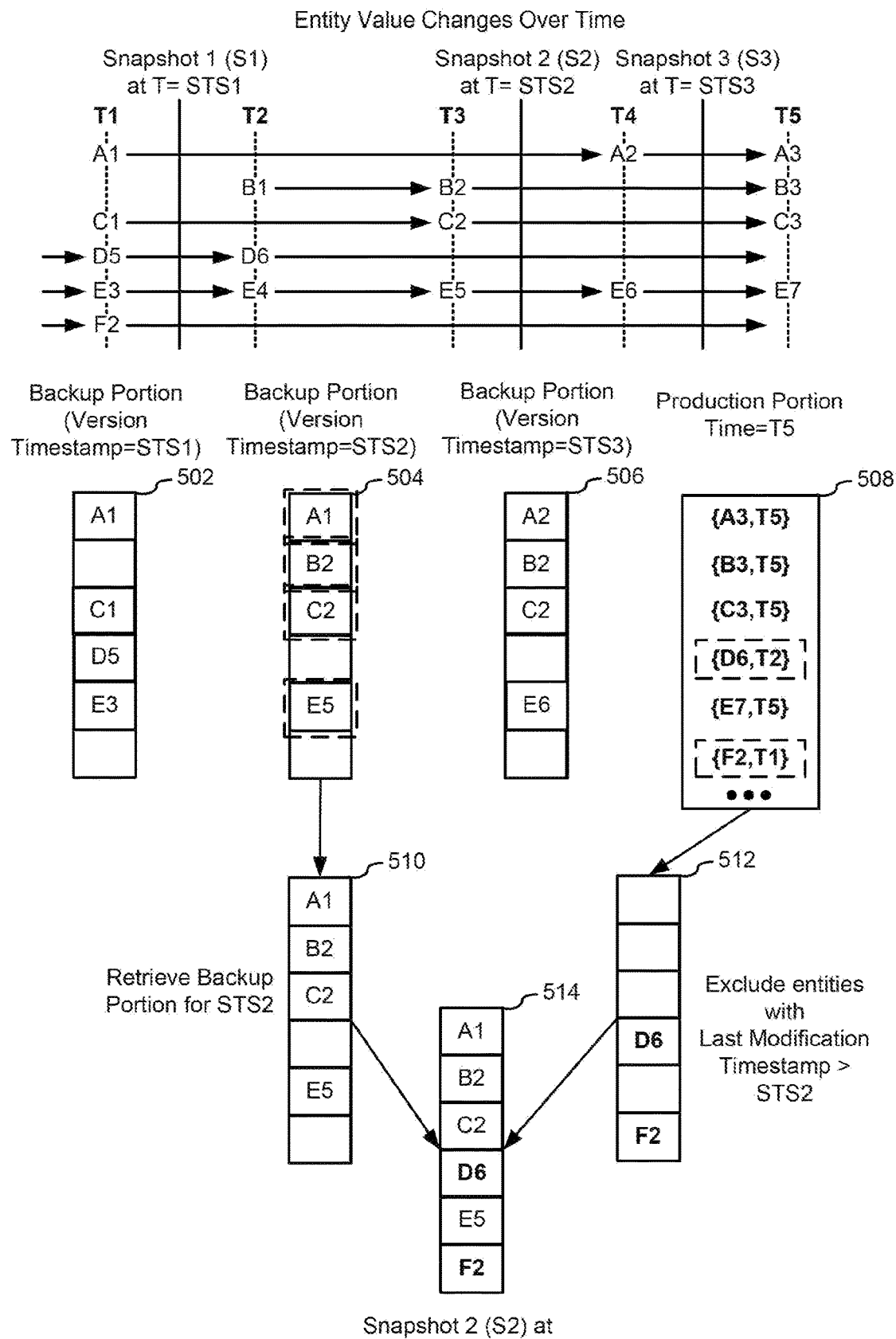
FIG. 5A is a block diagram illustrating an example of creating a consistent database snapshot from a single backup portion, in accordance with some embodiments.

FIG. 5A illustrates an example of generating a database snapshot by selectively merging backup versions stored in one of several independent backup portions, with current versions of entities stored in the production portion. In some embodiments, there are several independent backup portions in the one or more databases. Each independent backup portion is associated with a version timestamp, which corresponds to a snapshot timestamp. In some embodiments, not all past versions of an entity are stored as backup versions. Instead, each backup version corresponds to a particular database snapshot of the one or more databases. In some embodiments, a past version (e.g., not the current version) of an entity is stored in a backup portion as a backup version of that entity if the past version represents value of the entity at time indicated in a snapshot timestamp. Where backup portions are independent from each other (e.g., as shown in FIG. 5A), one single backup portion independently provides backup versions of entities that are necessary to generate a database snapshot at the time indicated in the backup portion's version timestamp. Thus, removing one backup portion does not affect the ability to generate a database snapshot at a time corresponding to the version timestamp of another backup portion. Consequently, while there is some duplication caused by having independent backup portions (e.g., a backup version of an entity may be stored in multiple different backup portions), when a respective backup portion is no longer needed (e.g., because a user has "deleted" a backup corresponding to the respective backup portion), the respective backup portion can be deleted without adversely affecting other backup portions (e.g., because other backup portions do not depend on the respective backup portion).

In some embodiments, there is one production portion, in which current versions of entities are stored; the current versions are not duplicated in any backup portions. In some embodiments, each current version is additionally stored with a last modification timestamp, which corresponds to a time at which the value represented by the current version begins to exist. In the example shown in FIG. 5A, current versions of entities A, B, C, D, E and F are stored with their respective last modification timestamps, for example, in the form of {A3, T5}, {B3, T5}, {C3, T5}, {D6, T2}, {E7, T5} and {F2, T1}, respectively.

In some embodiments, after receiving a request for a database snapshot, the database snapshot is generated by merging backup versions from one single backup portion, with selected current versions from the production portion. In some embodiments, backup versions are selected exclusively from the backup portion whose version timestamp corresponds to the same time as the snapshot timestamp. In some embodiments, current versions of entities from the production portion having last modification timestamps after the time indicated in the snapshot timestamp (e.g., current versions of entities that were created after the snapshot time) are excluded from the database snapshot.

In the example shown in FIG. 5A, there are three independent backup portions as they exist as Time=T5: Backup Portion 502 having Version Timestamp=STS1, Backup Portion 504 having Version Timestamp=STS2, and Backup Portion 506 having Version Timestamp=STS3. The Backup Portion 502 includes four backup versions of entities, A1, C1, D5 and E5. A backup version of B1 is not stored in Backup Portion 502 because Snapshot 1 only includes the values of entities that existed at time STS 1, and B1 did not exist at time STS 1. F2 is also not stored in Backup Portion 502 as a backup version of entity F, because F2 is the current version, and in this embodiment, current versions are not stored in backup portions.

Backup Portion 504 includes backup versions, A1, B2, C2 and E5. Backup version A1 represents the value of entity A at both time=STS1 and time=STS2, and therefore is included in both Backup Portion 502 and Backup Portion 504. For similar reasons, backup versions B2, C2, and E5 are also stored in Backup Portion 504, because they represent the values of entities B, C and E at STS2, and they are not current versions of these entities. In this example, current versions are not stored in backup portion(s), D6 and F2 are therefore not stored in Backup Portion 504, thereby conserving storage space at Datastore Server 106. In the example illustrated in FIG. 5A, although B1 is a past version of entity B, B1 is not stored as a backup version in any of the backup portions, because there was no request to store a database snapshot at a time between T2 and T3 (when B1 was the current value of B in the production portion). In other words, because there was no request to store a database snapshot between T2 (when B1 was created) and T3 (when B2 was created), B1, albeit a past version of entity B, was not stored, in Backup Portion 504 as a backup version. For similar reasons, E4 also was not stored as a backup version. In situations where a large number of entity changes occur between two database snapshots, this approach can be highly efficient because it avoids creating backup versions that are not needed to generate any of the requested database snapshots.

Backup Portion 506 includes backup versions, A2, B2, C2, and E6. These backup versions are included in Backup Portion 506 because they represent the values of entities A, B, C and E at time=STS2, and these values are not the current values for these entities.

Also in the example shown in FIG. 5A, current versions of entities A, B, C, D, E and F are stored in the production portion (508) with their respective last modification timestamps, for example, in the form of {A3, T5}, {B3, T5}, {C3, T5}, {D6, T2}, {E7, T5} and {F2, T1}, respectively. As noted above, the production portion is where current versions of entities are stored. In this example, current versions A3, B3, C3 and E7 are stored with timestamp T5 because entities A, B, C and E were most recently modified at time T5. In other words, the current versions A3, B3, C3 and E7 were created at time T5. Current versions D6 and F2 are stored with timestamps T2 and T1, respectively, because the most recent modification to entity D was at time T2, and the current version of F, F2 was first created (and also "last modified") at time T1.

In FIG. 5A, after a receiving a request for Snapshot 2, which includes values of entities as existed at time=STS2, Snapshot 2 is generated by merging selected backup versions stored in Backup Portion 504, with selected current versions in Production Portion 508. Current versions in the production portion are selected except for those having last modification timestamp after time STS2. In this example, current versions A3, B3, C3 and E7 are not selected (or are excluded), because their last modification timestamps correspond to time T5, which is after STS 2. Snapshot 2 514 is then generated by merging selected backup versions 510 of entities with selected current versions 512 of entities. In this example, only backup versions stored in Backup Portion 504, which has the same version timestamp as that of Snapshot 2 (e.g., STS2), are used to generate Snapshot 2 514. Backup versions stored in Backup Portion 506 are not used to generate Snapshot S2, because some backup versions, such as A2 and E6, stored in Backup Portion 506 did not exist at time STS2, thus are not part of Snapshot 2. In this example, backup versions are retrieved from one single backup portion, Backup Portion 504. No backup versions are retrieved from Backup Portion 502 or Backup Portion 506. Therefore, removing backup versions stored in Backup Portion 502 or Backup Portion 506, or both, will not affect generating Snapshot 2 514. This approach can be highly efficient, especially when it is indicated that a database snapshot is no longer needed to be stored, because it allows the removal of data previously stored for that database snapshot, (e.g., a corresponding backup portion), without affecting the ability to generate other database snapshots.

Snapshots Generated from Multiple Dependent Backup Portions

Figure 5B:
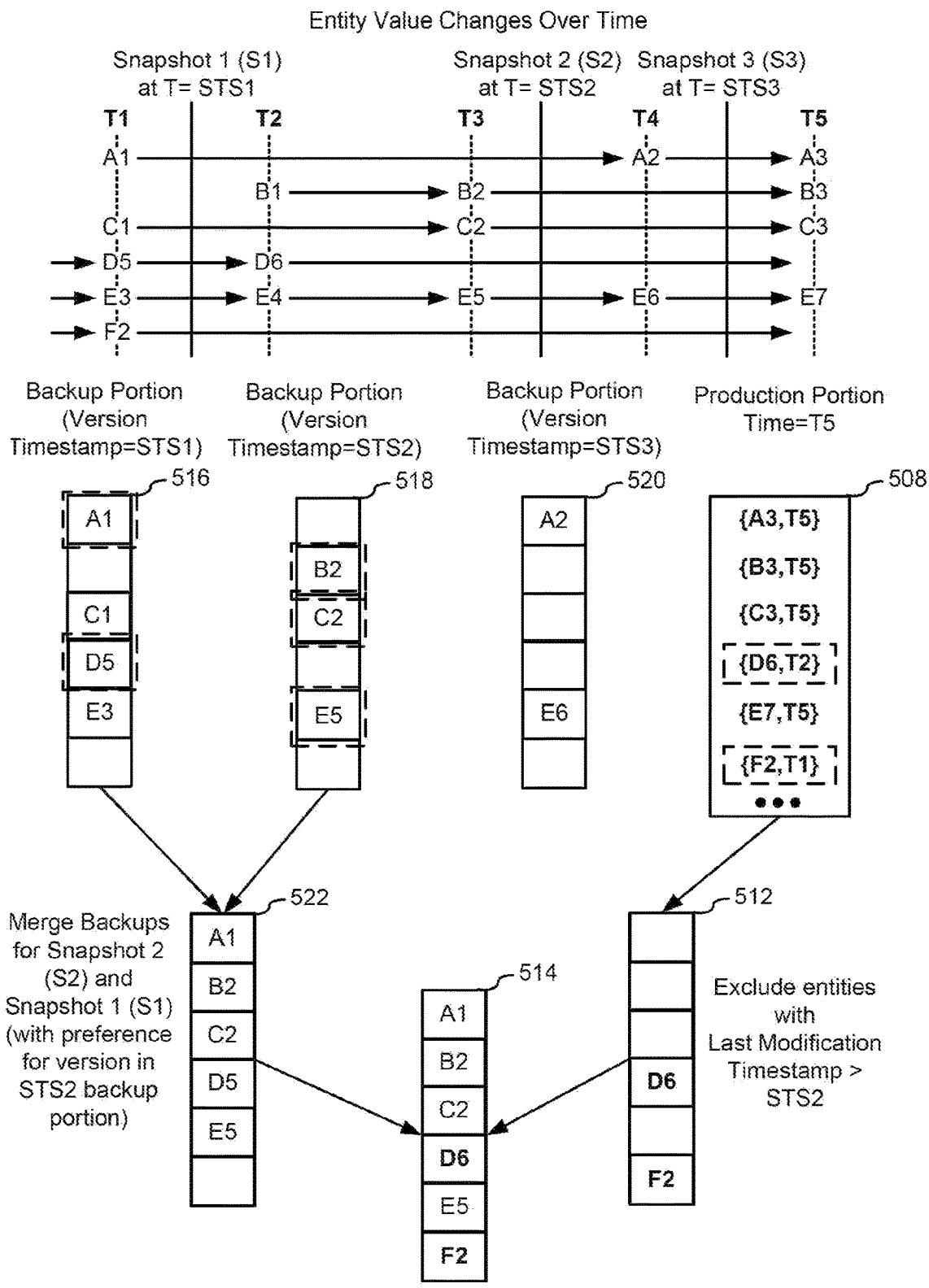
FIG. 5B is a block diagram illustrating an example of creating a consistent database snapshot from multiple backup portions, in accordance with some embodiments.

FIG. 5B illustrates an example of generating a database snapshot by merging backup versions stored in multiple dependent backup portions, with current versions of entities stored in the production portion.

In some embodiments, a past version of an entity is stored as a backup version of that entity if the backup version represents the value of the entity at the time indicated in the snapshot timestamp and the past version has not been previously stored as a backup version in any other backup portions. If a past version has been previously stored in a backup portion, it is not stored again (or duplicated) as a backup version in any other backup portions. Therefore, in some embodiments, a backup version, although being a part of two or more database snapshots, is stored in only one backup portion. Consequently, removing one single backup portion, in some embodiments, affects the generation of two or more database snapshots. Because, in some embodiments, to generate a single database snapshot, backup versions from two or more backup portions are needed, these two or more backup portions are dependent of each other. Notwithstanding the dependency among the multiple backup portions, this approach can be highly efficient, especially when entities changes are sparse but requests for storing database snapshots are frequent, because it reduces data redundancies among the backup portions.

In some embodiments, where backup portions are dependent of each other, a database snapshot is generated by (1) selecting relevant backup versions by merging backup versions from multiple dependent backup portions with preference for versions in the backup portion whose timestamp corresponds to the same time as that indicated in the snapshot timestamp, and (2) merging the selected backup versions with selected current versions stored in the production portion, with preference for a respective current version over a corresponding backup version when the last modification timestamp of the respective current version corresponds to a time before the snapshot time. Therefore, in some embodiments, backup versions are selected from not only the backup portion having the same timestamp as that of the database snapshot, but also from backup portions whose timestamps correspond to a time before that indicated in the snapshot timestamp. Alternatively, in some situations, where all necessary backup versions are stored in one backup portion, only backup versions from that single backup portion are needed. For example, in the example shown in FIG. 5A, Backup Portion 504 includes all backup versions that are necessary to generate Snapshot 2, thus no backup versions from other backup portions are needed.

In the example shown in FIG. 5B, there are three dependent backup portions: Backup Portion 516 having Version Timestamp=STS1, Backup Portion 518 having Version Timestamp=STS2, and Backup Portion 520 having Version Timestamp=STS3. Backup Portion 516 includes the same number of backup versions as does Backup Portion 502 shown in FIG. 5A.

Backup Portion 518, however, stores a fewer number of backup versions, compared to Backup Portion 504 shown in FIG. 5A. Backup Portion 518 in FIG. 5B only stores backup versions: B2, C2 and E5, because these past versions represent the values of entities B, C and E at time=STS2, and they have not been previously stored as backup versions in other backup portions, such as Backup Portion 516. Although it is a part of Snapshot 2 514, A1 is not stored or duplicated in Backup Portion 518 because A1 has previously been stored as a backup portion in Backup Portion 516.

Backup Portion 520 stores an even fewer number of backup versions, compared to Backup Portion 506 in FIG. 5A, because Backup Portion 520 does not duplicate backup versions of entities from Backup Portion 516 and Backup Portion 518. In the example shown in FIG. 5B, only A2 and E6 are stored in Backup Portion 520. B2 and C2 are not stored or duplicated in Backup Portion 520, because they have previously been stored as backup versions in Backup Portion 518. In the example shown in FIG. 5B, current versions of entities A, B, C, D, E and F are stored in the production portion (508) with their respective last modification timestamp, for example, in the form of {A3, T5}, {B3, T5}, {C3, T5}, {D6, T2}, {E7, T5} and {F2, T1}.

In the example shown in FIG. 5B, in order to generate Snapshot 2 514, backup versions are first selected by merging backup versions from both Backup Portion 516 and Backup Portion 518, with preferences for backup versions from Backup Portion 518. The preference reflects the fact that backup versions from Backup Portion 518 represent entities values that are more recent (up-to-date), for the purpose to generating Snapshot 2 514, than those in Backup Portion 516. Backup versions from Backup Portion 516 are merged with backup versions from the second backup portion with preference for E5 over E3, to produce the selected backup versions 522. These selected backup versions 522 are, in turn, merged with selected current versions 512, with preference for D6 (the current version) over D5 (a backup version), to generate Snapshot 2 514. The preference is given to current versions over backup versions, to reflect the fact that when both the current version and the backup version have timestamps before snapshot timestamp, the current version is more recent than the backup version. In other words, this preference serves to overwrite backup versions that were retrieved from a backup portion corresponding to a prior snapshot timestamp (e.g., STS1) that precedes the respective snapshot timestamp (e.g., STS2) of the requested database snapshot where the backup versions correspond to versions of the entities that were deleted or modified between the prior snapshot timestamp and the respective snapshot timestamp but have not been modified since the respective timestamp (e.g., a version of the entity that is still stored in the production portion of the one or more databases).

In this example, backup versions from multiple dependent backup portions are selected to generate Snapshot 2. It should be noted that, removing Backup Portion 516 would affect generating not only Snapshot 1, but also Snapshot 2, because backup version A1, although needed for both Snapshot 1 and Snapshot 2, is stored only in Backup Portion 516. On the other hand, because A1 is not duplicated in Backup Portion 518 or Backup Portion 520, the efficiency of storage space is increased.

Snapshots Generated from Multiple Backup Versions with Backup Timestamps

Figure 5C:
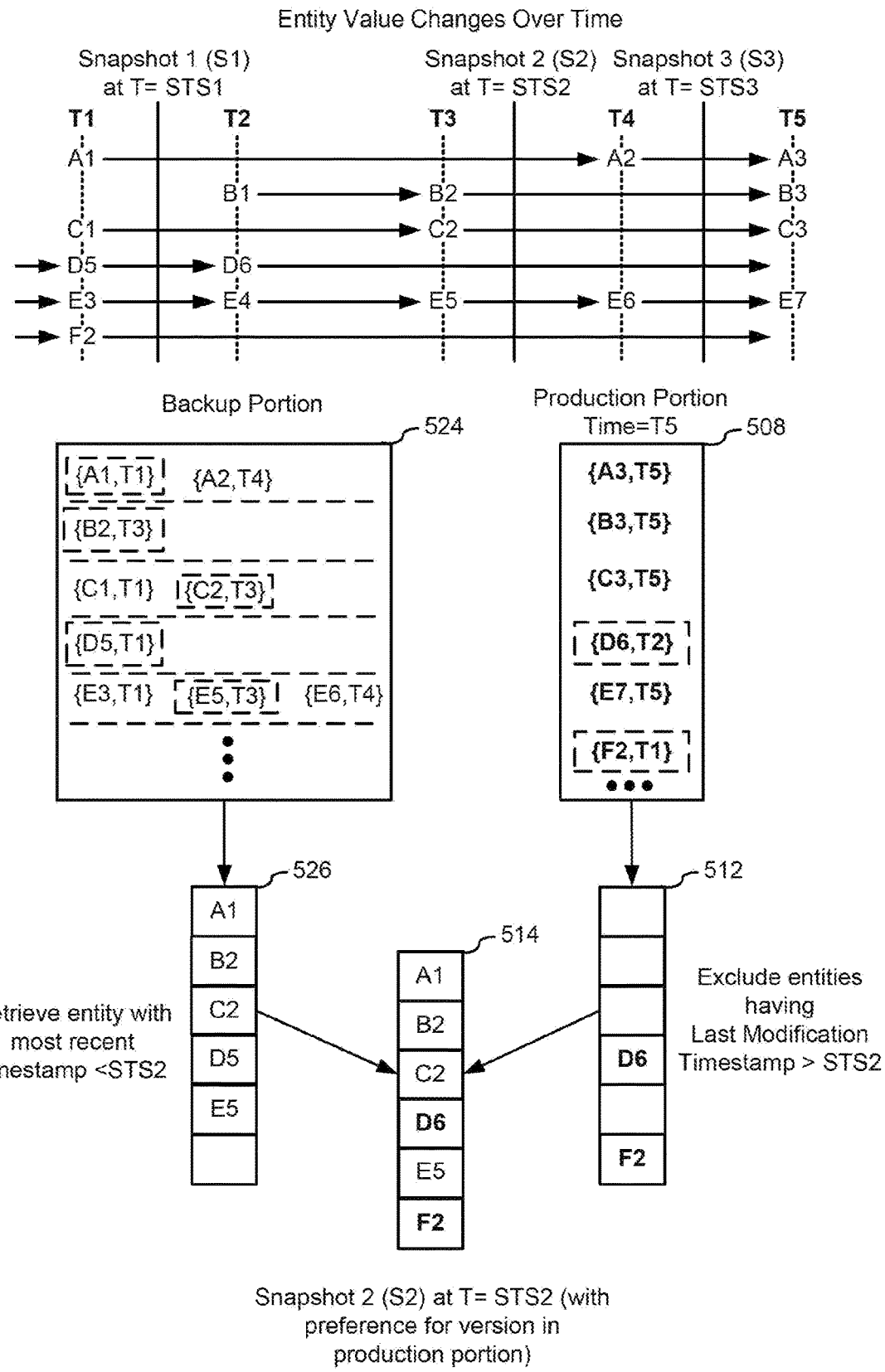
FIG. 5C is a block diagram illustrating an example of creating a consistent database snapshot from a shared backup portion, in accordance with some embodiments.

FIG. 5C illustrates an example of generating a database snapshot by merging backup versions stored in one backup portion—where a backup version is stored with a backup timestamp—with current versions stored in the production portion.

In some embodiments, backup versions are stored within one backup portion, where a backup version is additionally stored with a backup timestamp. A backup version's backup timestamp corresponds to a time at which a prior version of the corresponding entity on which the backup version is based was first written into the production portion. For example, in FIG. 5C, because backup version A1 was first written into production portion 508 at T1, it is stored with the backup timestamp T1. Similarly, in FIG. 5C, because backup version C2 was first written into production portion 508 at T3, it is stored with the backup timestamp T3.

In some embodiments, to generate a database snapshot, for relevant entities, backup versions having backup timestamps before the snapshot timestamp are selected. In situations where, for a same entity, there are multiple backup versions having backup timestamps before the snapshot timestamp, the backup version having the most recent backup timestamp (before the snapshot timestamp) is selected, because that backup version has the most up-to-date value for the purpose of generating the database snapshot. The selected backup versions are then merged with current versions from the production portion with preference for a current version over a backup version. Current versions from the production portion are selected by excluding current versions having last modification timestamps after the snapshot timestamp.

In the example shown in FIG. 5C, there is a shared Backup Portion 524, where all backup versions (A1, A2, B2, C1, C2 . . . ) are stored. Backup versions of entities are stored with corresponding backup timestamps, for example, in the form of {A1, T1}, {A2, T4}, {B2, T3}, {C1, T1}, {C2, T3}. In FIG. 5C, current versions of entities A, B, C, D, E and F are stored with their respective last modification timestamps in the production portion (508), in the form of {A3, T5}, {B3, T5}, {C3, T5}, {D6, T2}, {E7, T5} and {F2, T1}. The last modification timestamp corresponds to a time at which the value represented by the current version begins to exist. Thus, when an entity is modified, the entity and last modification timestamp from Production Portion 508 can be copied to Backup Portion 524 where the last modification timestamp will serve as the backup timestamp for the respective backup version of the entity.

In the example shown in FIG. 5C, after receiving a request for Snapshot 2, backup versions 526 A1, B2, C2, D5 and E5 are selected, because their respective backup timestamps indicate that they represent the values of those entities at time=STS2. As shown in FIG. 5C, two backup versions of entity C (e.g., C1 and C2) have timestamps before STS2; backup version C2 is selected, over C1, to generate Snapshot 2, because C2's backup timestamp (T3) is more recent than C1's backup timestamp (T1). Current versions 512 D6 and F2 are selected because their last modification timestamps indicate a time before (alternatively, in some implementations, at or before) STS2.

In FIG. 5C, selected backup versions 526 are merged with selected current versions 512 to generate Snapshot 2 514, with preference given to D6 (the current version) over D5 (a backup version). D6 is preferred over D5, because, as indicated by their respective timestamps, D6 is a more recent version of entity D. In this example, Backup Portion 524 as a whole is not associated with a specific timestamp; instead, an individual backup version of a particular entity is associated with a backup timestamp and a current version of the particular entity is associated with a last modification timestamp. This approach eliminates the need to simultaneously maintain several backup portions; the efficiency of the storage space is also increased when entities value changes are infrequent (e.g., the total number of backup versions is small).

Figure 5D:
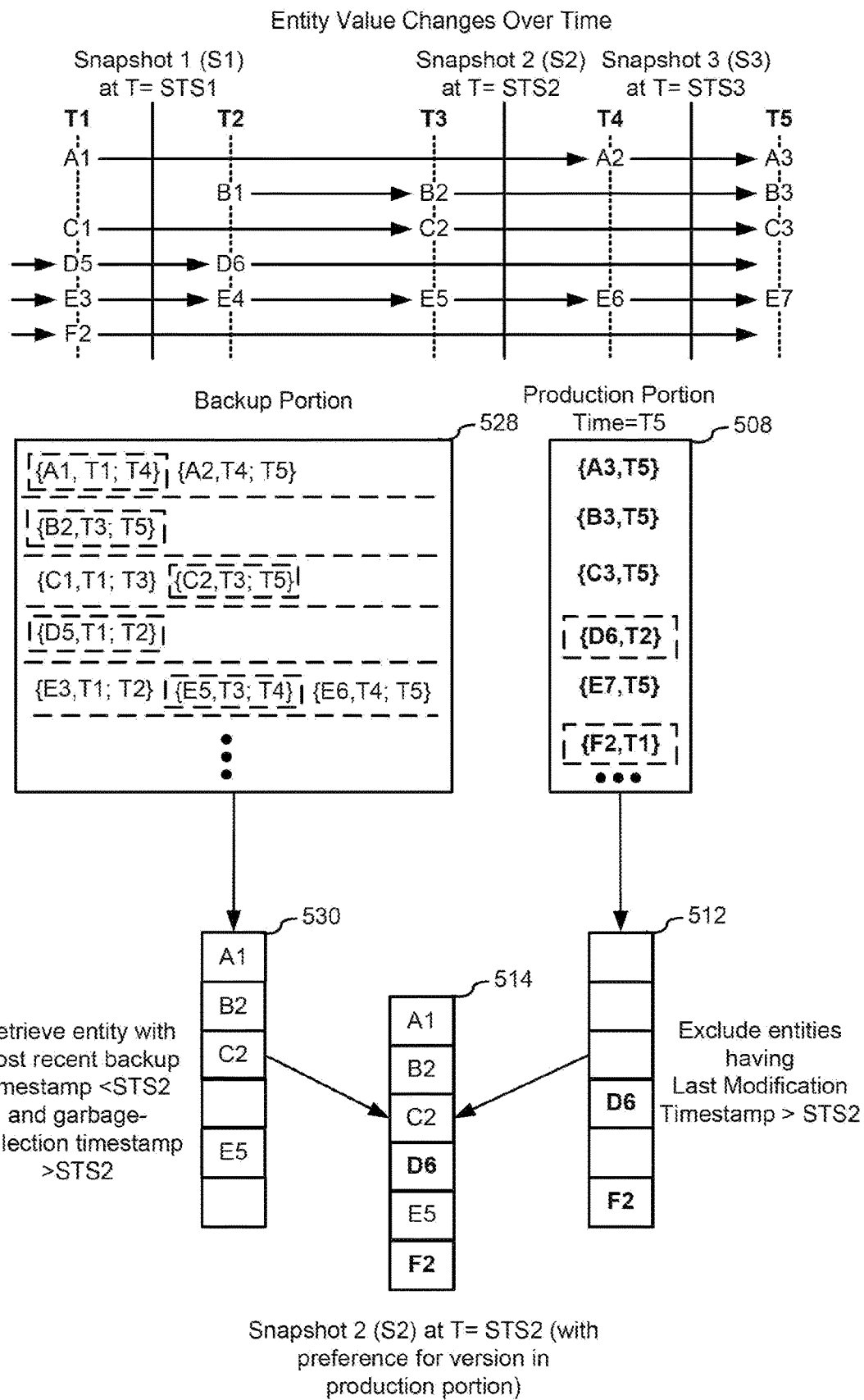
FIG. 5D is a block diagram illustrating an example of creating a consistent database snapshot from a shared backup portion with timestamp based garbage collection, in accordance with some embodiments.

Snapshots Generated from Multiple Backup Versions with Backup Timestamps and Garbage Collection The lower portion of FIG. 5D illustrates an example of storing a backup version with an additional garbage-collection timestamp, in order to provide Datastore Server 106 with information enabling selective removal of backup versions, in particular, backup versions that are part of database snapshot(s) that no longer need to be stored. Similar to the backup versions shown in FIG. 5C, backup versions in FIG. 5D are also stored with their respective backup timestamp. A backup timestamp here in FIG. 5D also corresponds to a time at which a prior version of the corresponding entity on which the backup version is based was first written into the production portion. For example, in FIG. 5D, because backup version A1 was first written into production portion at T1, it is stored with the backup timestamp T1.

In some embodiments, in addition to the backup timestamp, a backup version is additionally stored with a garbage-collection timestamp. The garbage-collection timestamp of a backup version corresponds to a time at which a version of the corresponding entity that replaced the prior version of the corresponding entity was written into the production portion, causing the backup version to be stored in the backup portion. In other words, the time period bookended by the backup version's backup timestamp and garbage-collection timestamp corresponds to the period during which the backup version was a current version. Take {C2, T3; T5} for example, T3 represents C2's backup timestamp and T5 represents C2's garbage-collection timestamp; the time period between T3 and T5 represents the period during which C2 was a current version of entity C. Database snapshots with timestamps during the time period between T3 and T5 would use C2 as the version of entity C.

In some embodiments, backup versions' garbage-collection timestamps are examined in order to select backup versions, which, in turn, are merged with current versions to generate a database snapshot. In some embodiments, only backup versions having backup timestamps before (alternatively, in some implementations, at or before) the snapshot timestamp, and garbage-collection timestamps after the snapshot timestamp (e.g., backup versions that were the current version of an entity at a time corresponding to the respective snapshot timestamp for the database snapshot), are selected.

In some embodiments, backup timestamp and garbage-collection timestamps are periodically examined (e.g., searched) in order to remove backup versions from the backup portion. In some embodiments, after receiving a communication indicating that a database snapshot no longer needs to be stored, backup versions previously stored are examined. In some embodiments, a backup version is identified for deletion if there is no snapshot timestamp that falls between the backup version's backup timestamp and garbage-collection timestamp. In other words, a backup version is identified for deletion, in some embodiments, if no database snapshot has been requested to be stored in the time period between the backup version's backup timestamp and its garbage-collection timestamp. This process is sometimes called garbage collection. A typical scenario is that a backup version of an entity is stored to generate a respective database snapshot, and the user determines that the database snapshot is no longer needed and thus the snapshot timestamp corresponding to the respective database snapshot is deleted. Subsequently, if the backup version is not needed for any other database snapshot, the backup version is deleted or marked for deletion.

In the example shown in FIG. 5D, there is one backup portion (528), in which, a backup version is stored with both a backup timestamp and a garbage-collection timestamp. For example, backup versions, A1, B2, C2, D5 and E5, are stored in the form of {A1, T1; T4}, {B2, T3; T5}, {C2, T2; T5}, {D5, T1; T2}, and {E5, T3; T4}, respectively. In the example shown in FIG. 5D, when selecting backup versions (530) to generate Snapshot 2, backup version D5 is not selected. Because D5's garbage-collection timestamp T2 does not correspond to a time after the timestamp of Snapshot 2 (STS2). In fact, T2 is before STS2. After receiving a communication indicating that data for generating Snapshot 2 no longer needs to be stored, STS2 is deleted and backup versions previously stored (e.g., A1, A2, B2, C1, C2, D5, E3, E5 and E6) are examined. E5 is identified for deletion after determining that there is no other snapshot timestamp that falls between E5's backup timestamp (T3) and E5's garbage-collection timestamp (T4). A1 is not identified for deletion because a snapshot timestamp (e.g., STS1) still falls between A1's backup timestamp (T1) and A1's garbage-collection timestamp (T4). A2, B2, C1, C2, D5, E3 and E6 are also not identified for deletion because at least one snapshot timestamp (e.g., STS1 or STS3) still falls between respective backup and garbage-collection timestamps for A2, B2, C1, C2, D5, E3 and E6.

Snapshots Generated from Backup Versions with Snapshot Identifiers

Figure 5E:
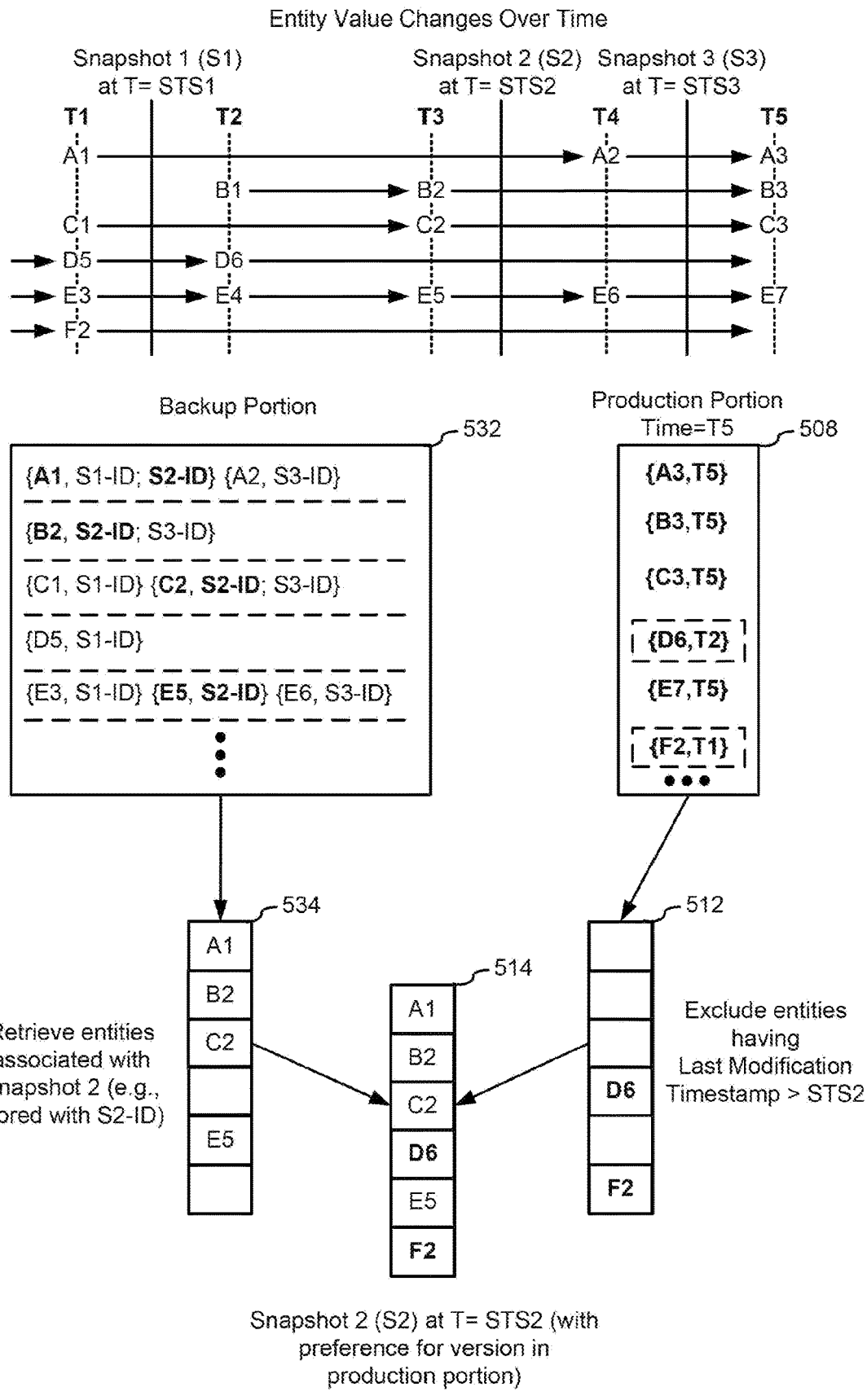
FIG. 5E is a block diagram illustrating an example of creating a consistent database snapshot from a shared backup portion with snapshot identifier based garbage collection, in accordance with some embodiments.

FIG. 5E illustrates an example of generating a database snapshot by merging selected backup versions stored in one backup portion—where a backup version is stored with one or more snapshot identifiers—with current versions stored in the production portion.

In some embodiments, a backup version is stored with one or more snapshot identifiers (also called tags). A snapshot identifier corresponds to a database snapshot that has been requested to be stored. In some embodiments, a snapshot identifier includes an identifier that uniquely identifies a database snapshot. In some embodiments, a snapshot identifier corresponds to a snapshot timestamp. In other embodiments, a snapshot identifier includes a time at which a database snapshot is requested to be stored. In some embodiments, a backup version is part of (i.e., included in) a database snapshot if one of the backup version's snapshot identifiers corresponds to the database snapshot. In other words, in some embodiments, a backup version is identified as not part of a respective database snapshot if the backup version is not stored with a snapshot identifier that corresponds to the respective database snapshot.

In some embodiments, when a backup version is identified as part of more than one database snapshot, although only stored in the backup portion once, the backup version is stored with several snapshot identifiers, each of which identifies a distinct database snapshot of which the backup version is a part. In some embodiments, after receiving a request for a database snapshot, backup versions stored with snapshot identifiers corresponding to the requested database snapshot are selected. Current versions in the production portion are selected by excluding those having last modification time stamp after the snapshot timestamp. The selected backup versions are then merged with the selected current version. While in some of the embodiments described above, when merging backup versions with current versions, preference was given to current versions over backup versions, in this embodiment, it is not typically necessary to give preference to current versions. In particular, because backup versions are associated with snapshot identifiers, a backup version is used to generate a database snapshot if it is associated with an identifier for the database snapshot and is not used to generate a database snapshot if it is not associated with an identifier for the database snapshot. For example, D5 is not included in the current versions 534 because it is not associated with an identifier for Snapshot 2 514 (e.g., S2-ID) and thus there is no need, in this example, to have a rule to determine whether to use D5 or D6 to generate Snapshot 2 514.

In some embodiments, after receiving a communication indicating that a database snapshot no longer needs to be stored, its corresponding snapshot identifier is removed from relevant backup versions. Furthermore, in some embodiments, backup versions that are not stored with any snapshot identifiers are identified for deletion. This process is sometimes called garbage collection using snapshot identifiers.

In some embodiments, where database snapshots are requested to be stored frequently, a backup version that is part of a number of database snapshots is stored with an equal number of snapshot identifiers, each identifying a corresponding database snapshot to which the backup version is a part. However, when generating a database snapshot, for each backup version, all the snapshot identifiers stored with that backup version must be examined (searched) to determine whether that backup version is part of the database snapshot. When the number of snapshot identifiers is large, the examination process can be time consuming. Therefore, in some embodiments, there is a limit on the number of snapshot identifiers with which a backup version is stored. For example, in some embodiments, an entity that does not change frequently will set an upper bound on the number of database snapshots that are available to be reconstructed (e.g., 1000 database snapshots). In these embodiments, once the upper bound is reached on a particular backup version, one or more previously stored database snapshots have to be deleted, and their snapshot identifiers removed from the backup versions, before any additional database snapshots can be stored, so that there is room for the identifiers associated with the new database snapshot to be stored with the backup version.

In the example shown in FIG. 5E, a backup version is stored with one or more snapshot identifiers; a snapshot identifier identifies a database snapshot, of which the backup version is a part. For example, {A1, S1-ID; S2-ID} indicates that backup version A1 is part of both Snapshot 1 and Snapshot 2, because A1 is stored with snapshot identifiers S1-ID (which corresponds to Snapshot 1) and S2-ID (which corresponds to Snapshot 2). For another example, {D5, S1-ID} indicates that backup version D5 is part of Snapshot 1, but not Snapshot 2 or 3. In the example shown in FIG. 5E, after receiving a request for Snapshot 2, several backup versions 534 are selected from Backup Portion 532 because each of the selected backup versions is stored with snapshot identifier S2-ID, which corresponds to Snapshot 2. Current versions 512 of entities are also selected from the Production Portion 508.

After receiving a communication indicating that Snapshot 2 514 no longer needs to be stored, backup versions in Backup Portion 532 are examined. Backup versions A1, B2, C2, and E5 are identified as associated with Snapshot 2. As a result, snapshot identifier S2-ID is removed from these backup versions. After removing the snapshot identifier S2-ID, E5 is identified for deletion, because after S2-ID is removed, E5 is no longer stored with any other snapshot identifier. Backup versions A1, A2, B2, C1, C2, D5, E3 and E6 are not identified for deletion, after removing S2-ID, because these backup versions are still stored with other snapshot identifiers (e.g., S1-ID or S3-ID). In the examples shown in FIGS. 5D-5E, the efficiency of the storage space is further enhanced because backup versions previously stored but no longer part of any required database snapshots can be identified and removed from the backup portion.

Figure 6:
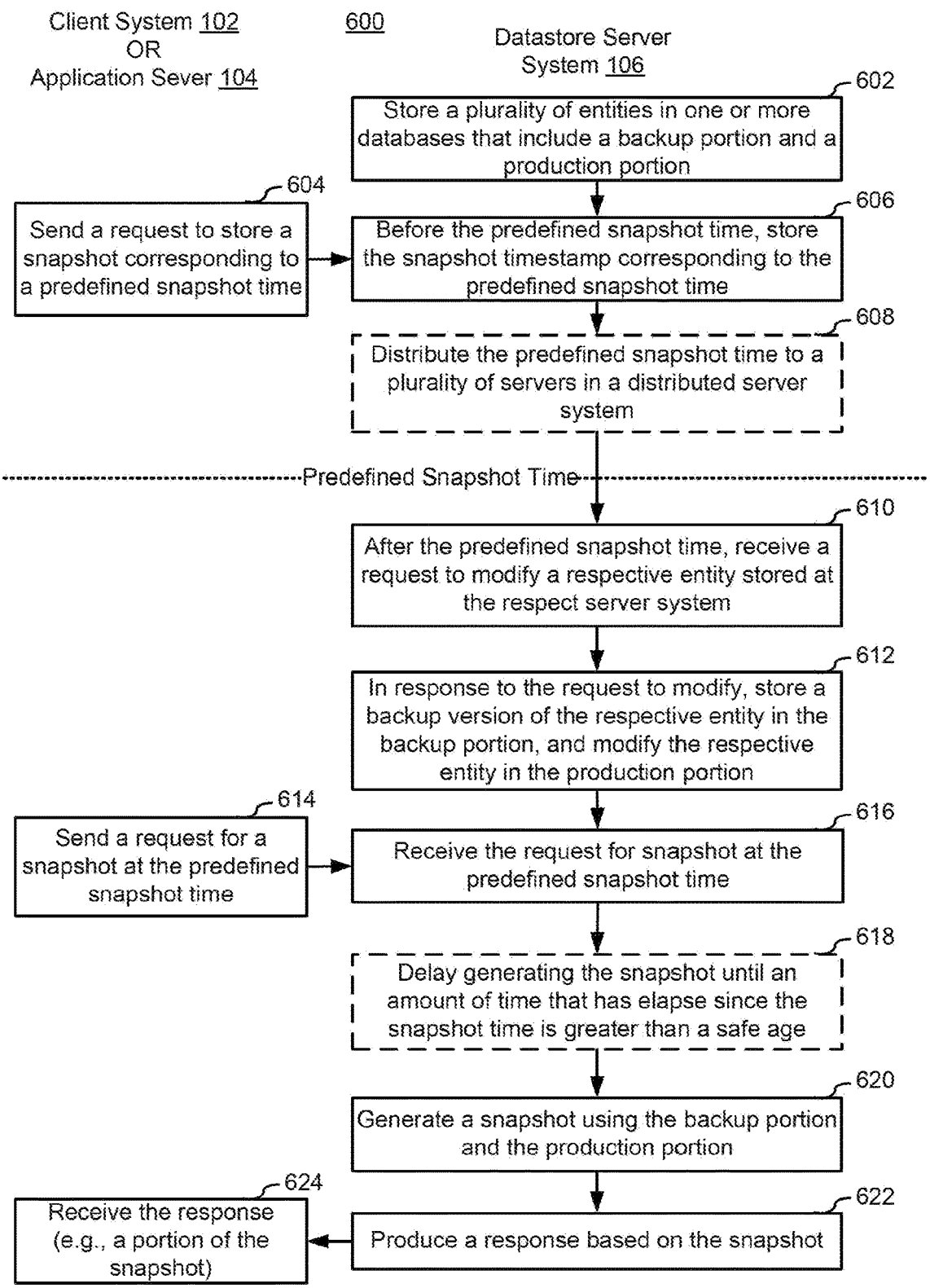
FIG. 6 includes a flow chart illustrating a method for storing backup data and creating a consistent database snapshot using the backup data, in accordance with some embodiments.
Figure 7A:
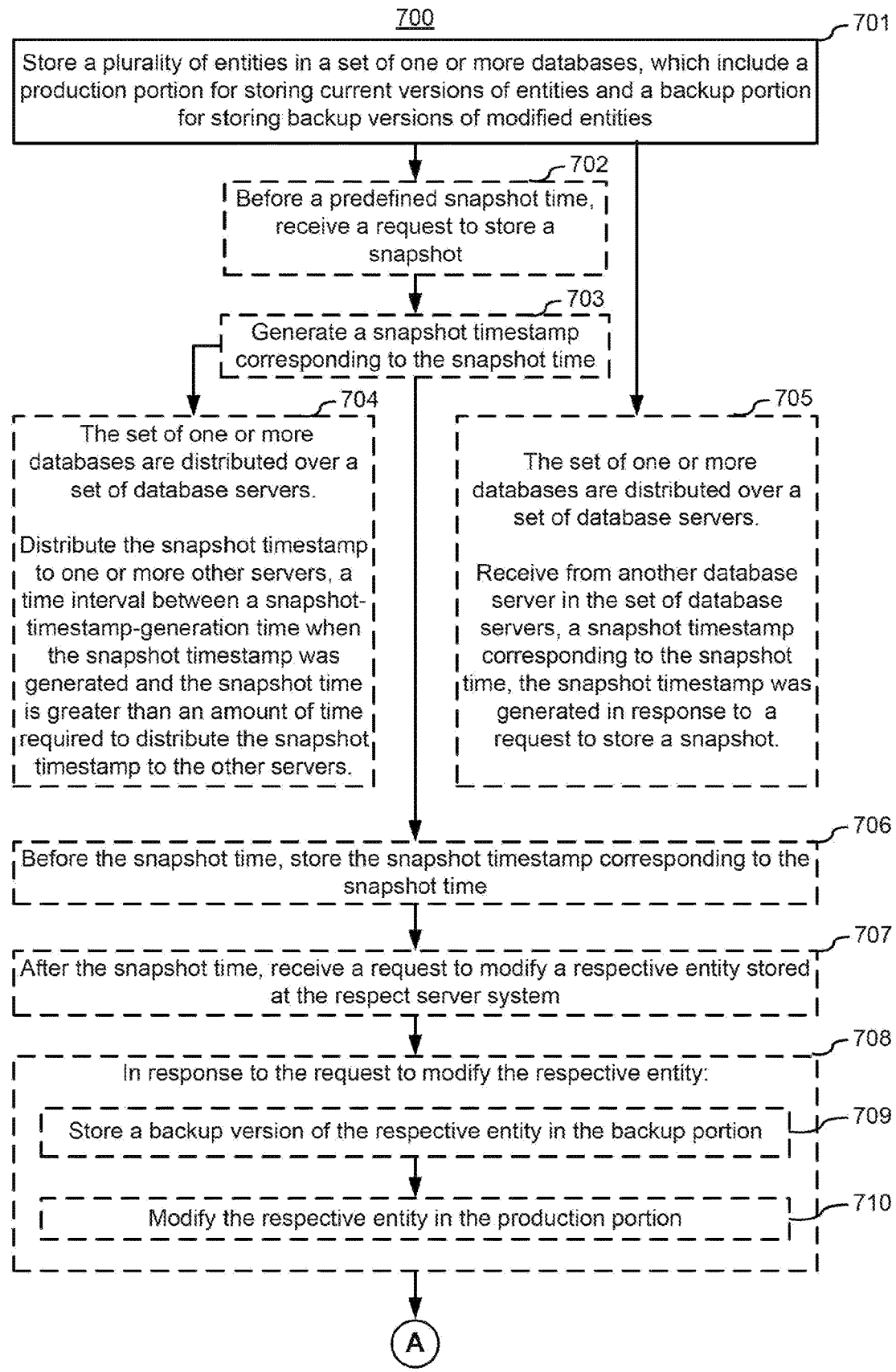
FIGS. 7A-7I include a flow chart illustrating a method for storing backup data and creating a consistent database snapshot at a server system using the backup data, in accordance with some embodiments.
Figure 7B:
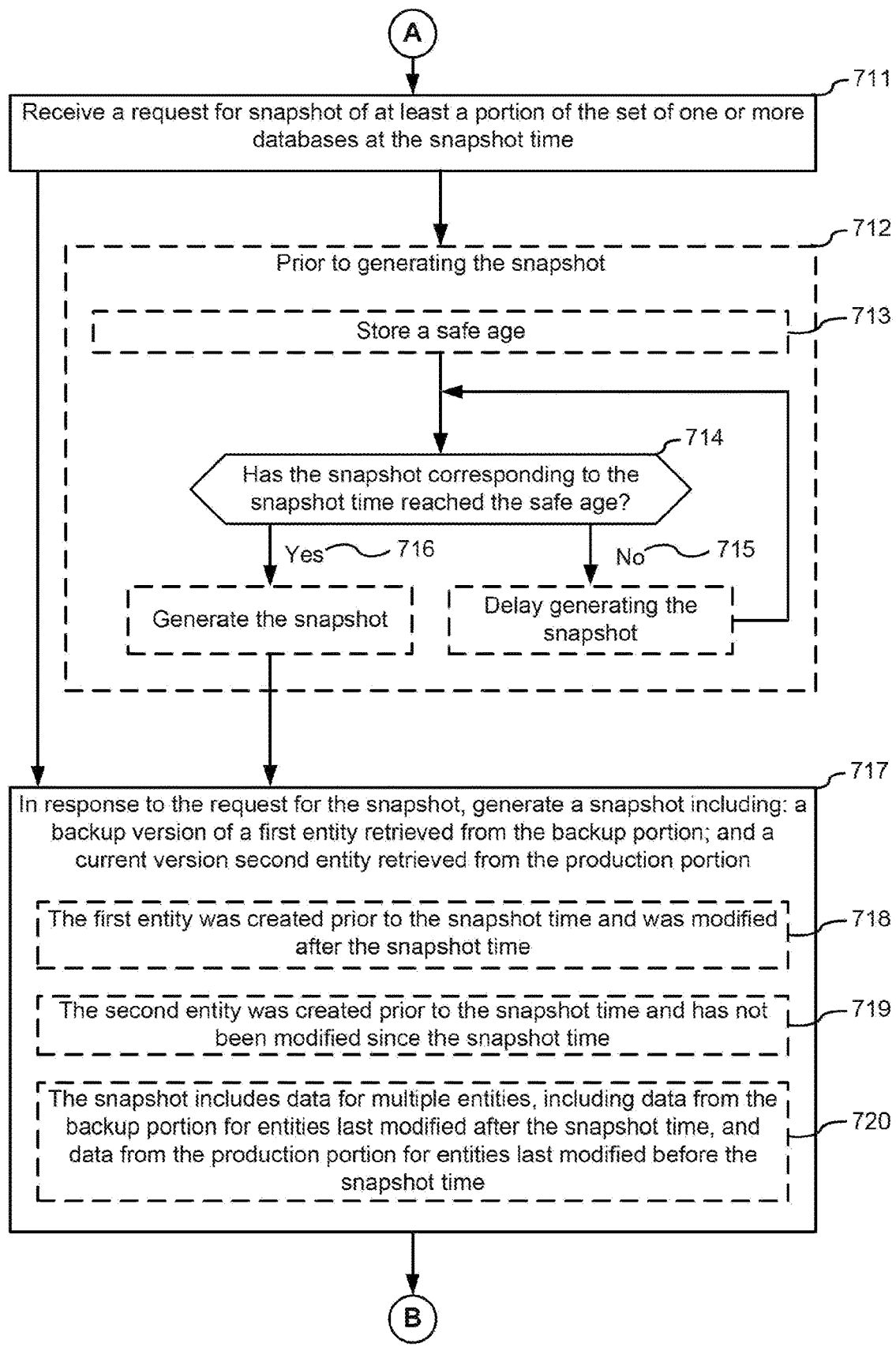
Figure 7C:
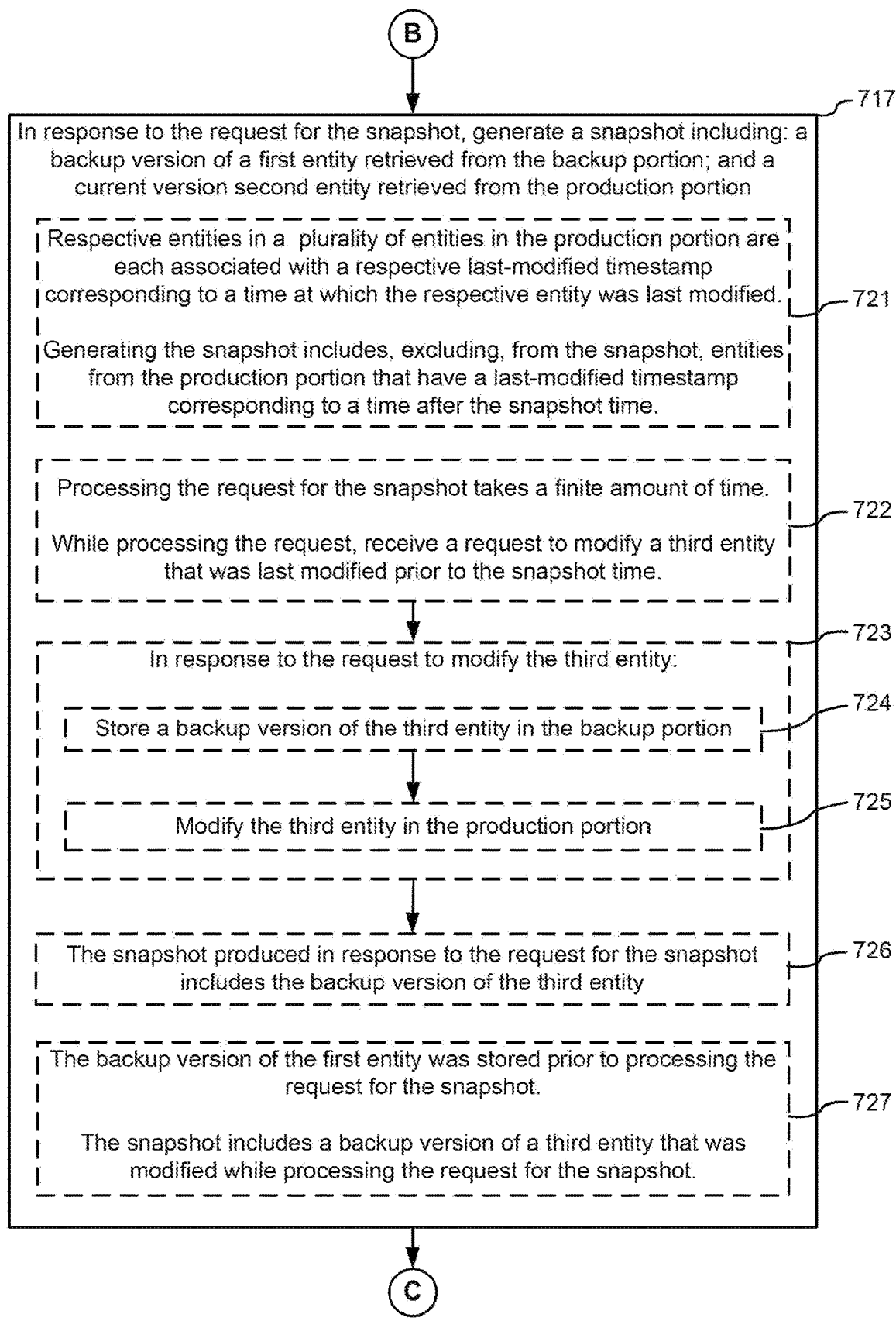
Figure 7D:
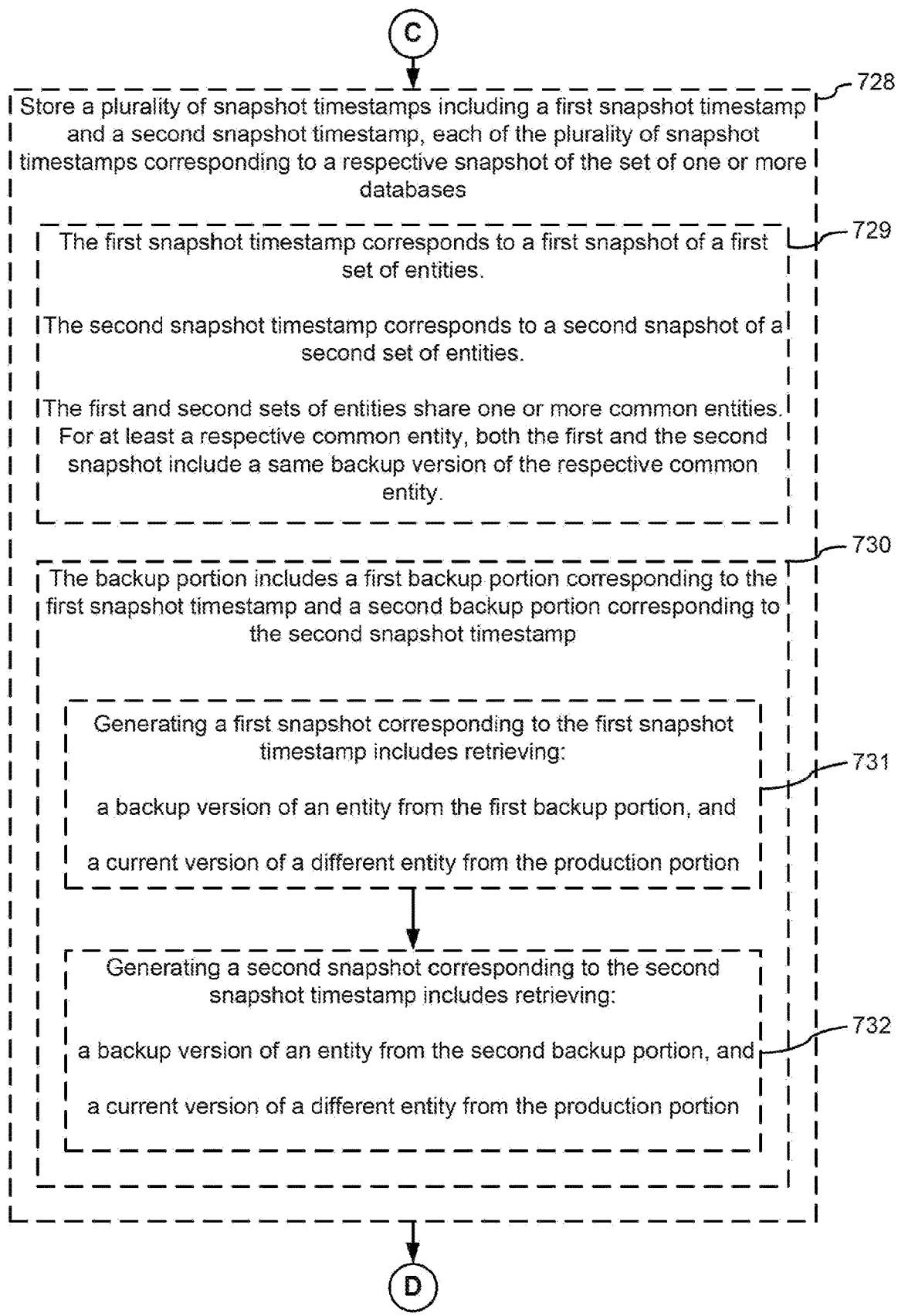
Figure 7E:
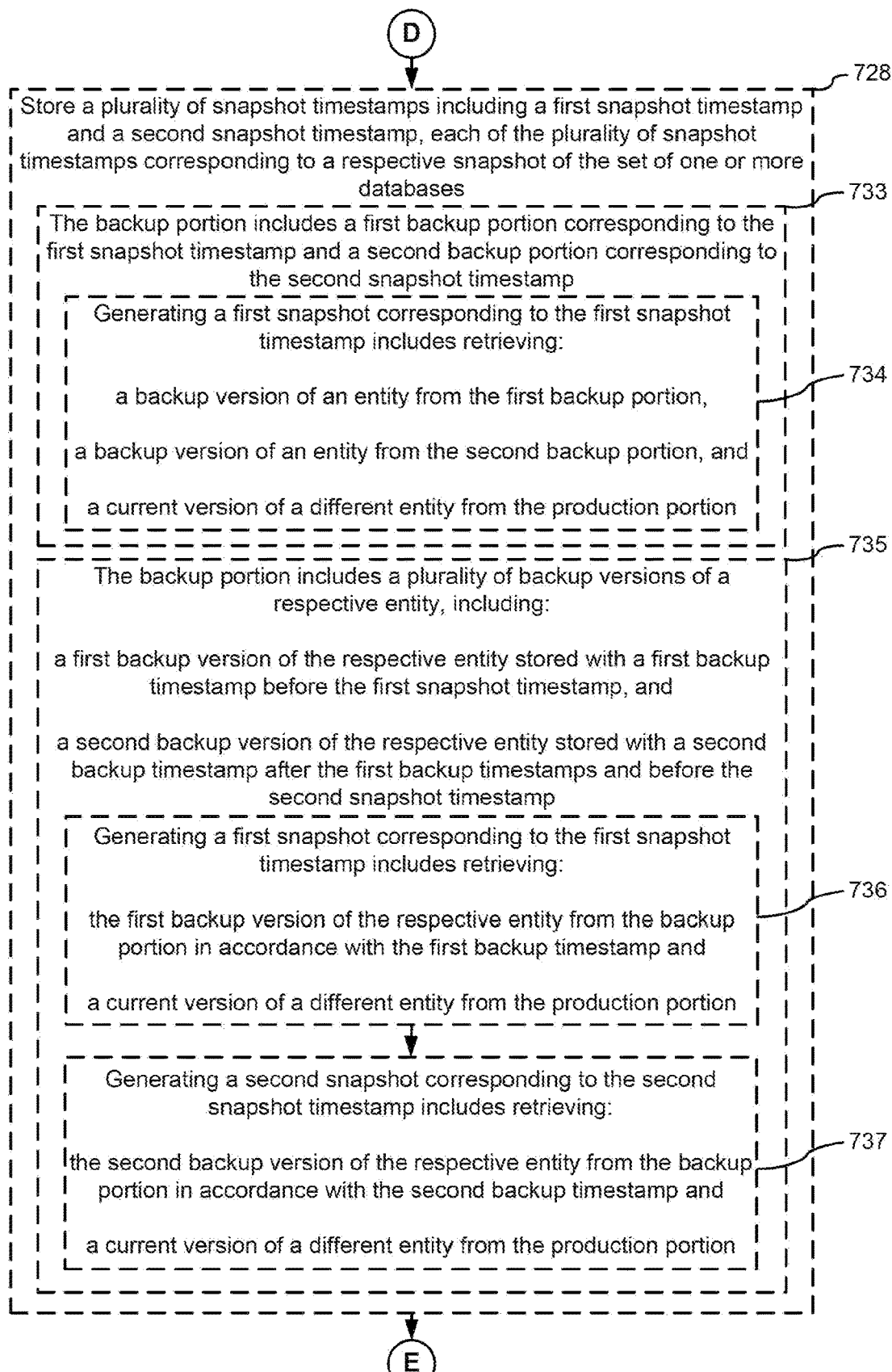
Figure 7F:
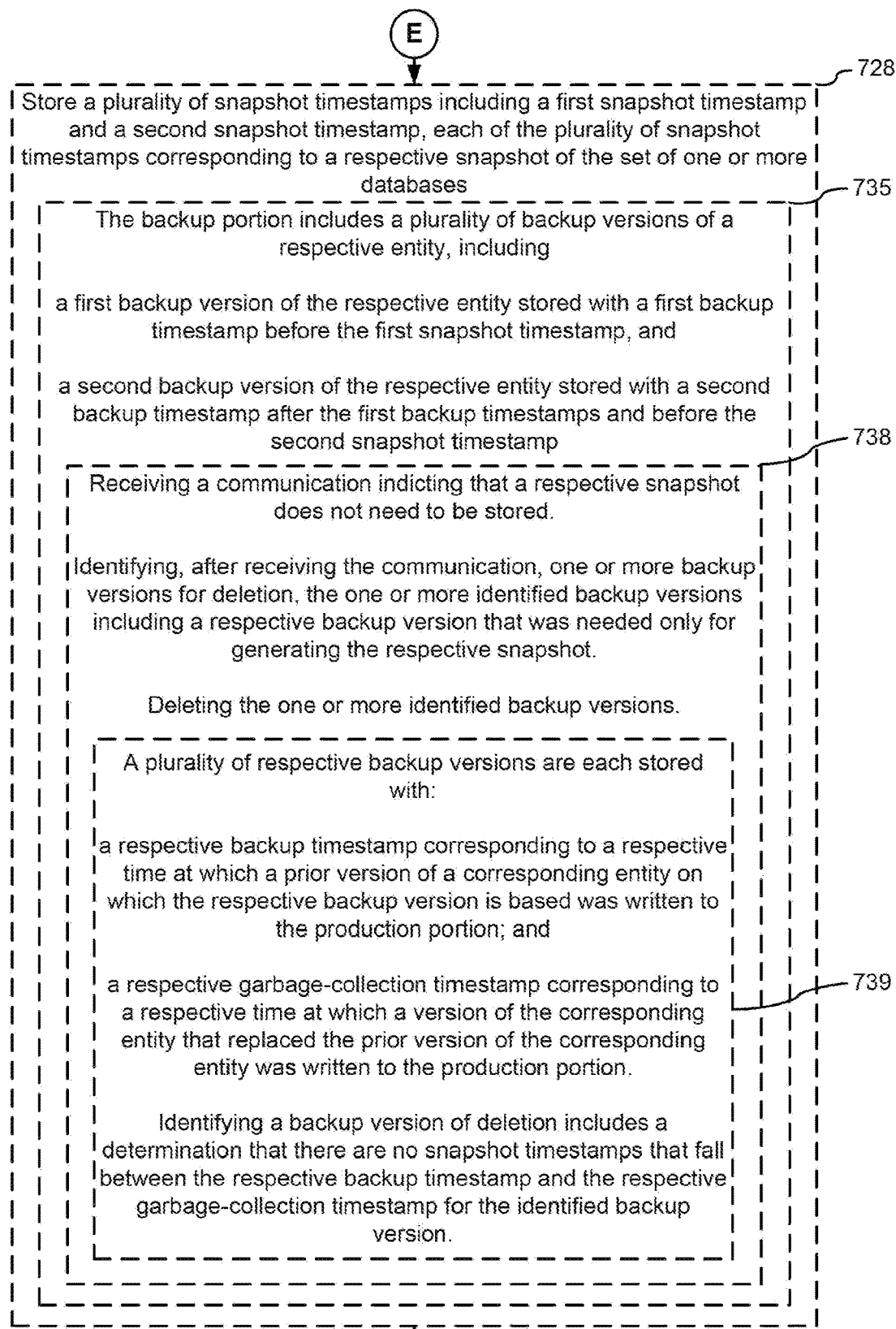
Figure 7G:
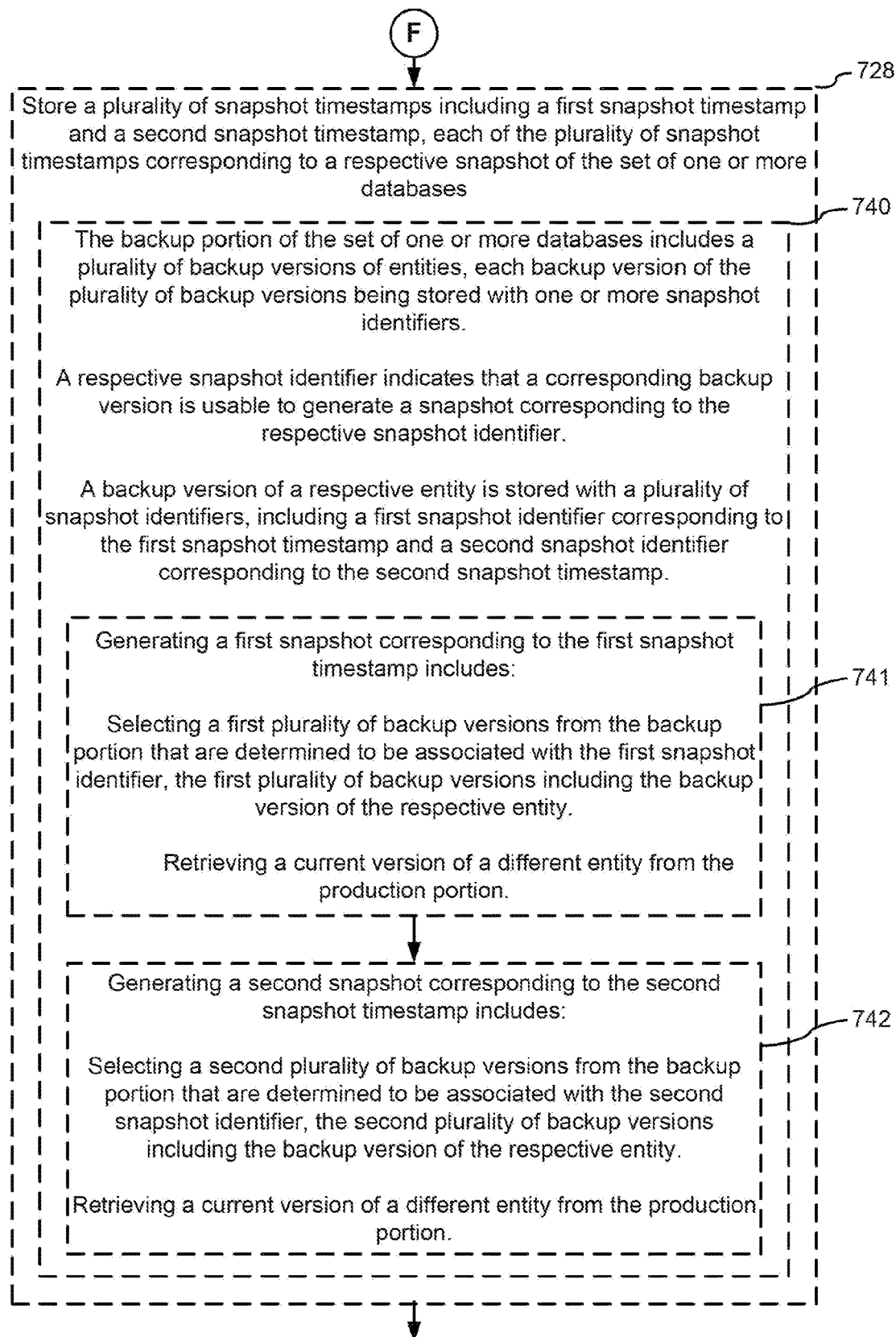
Figure 7H:
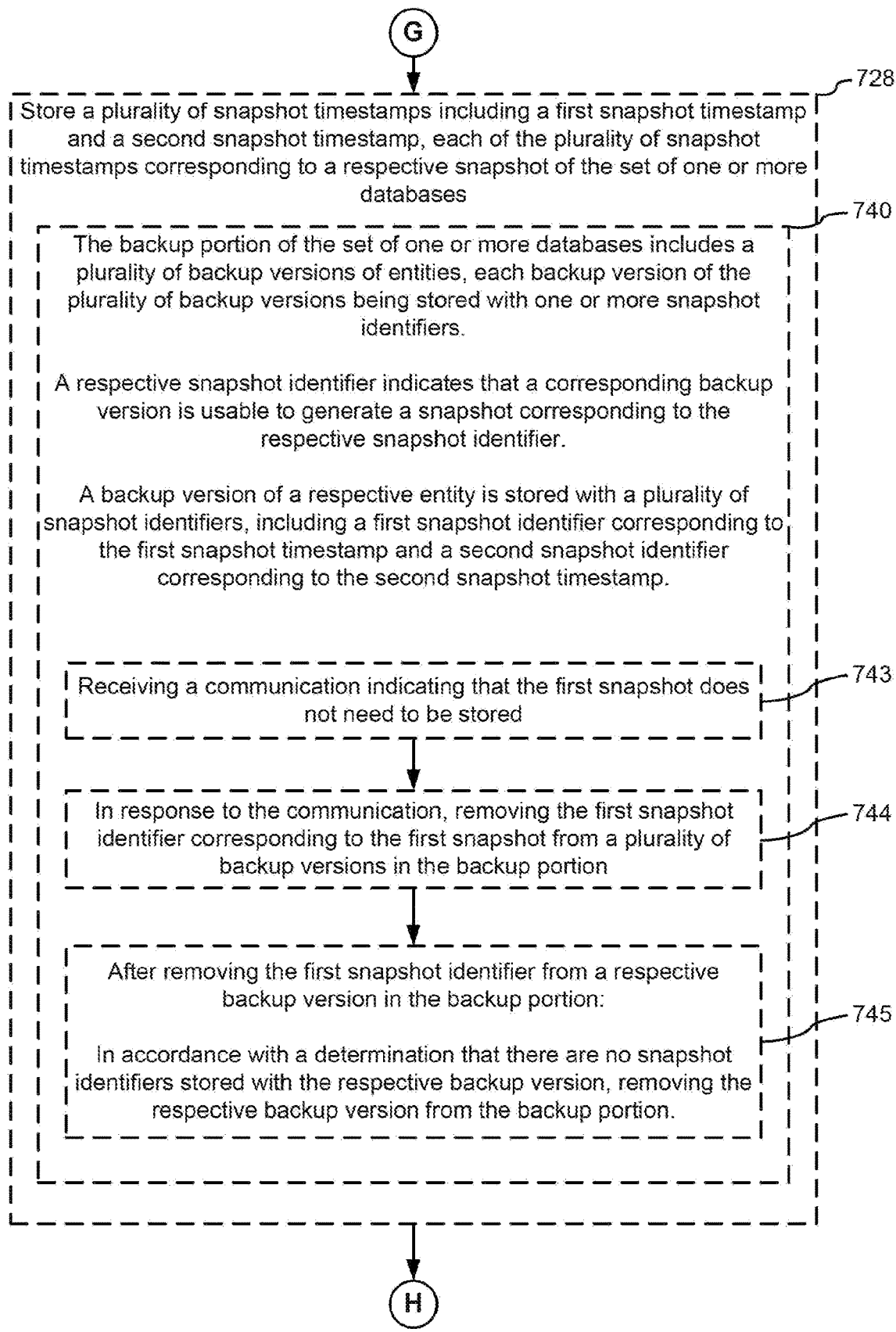
Figure 7I:
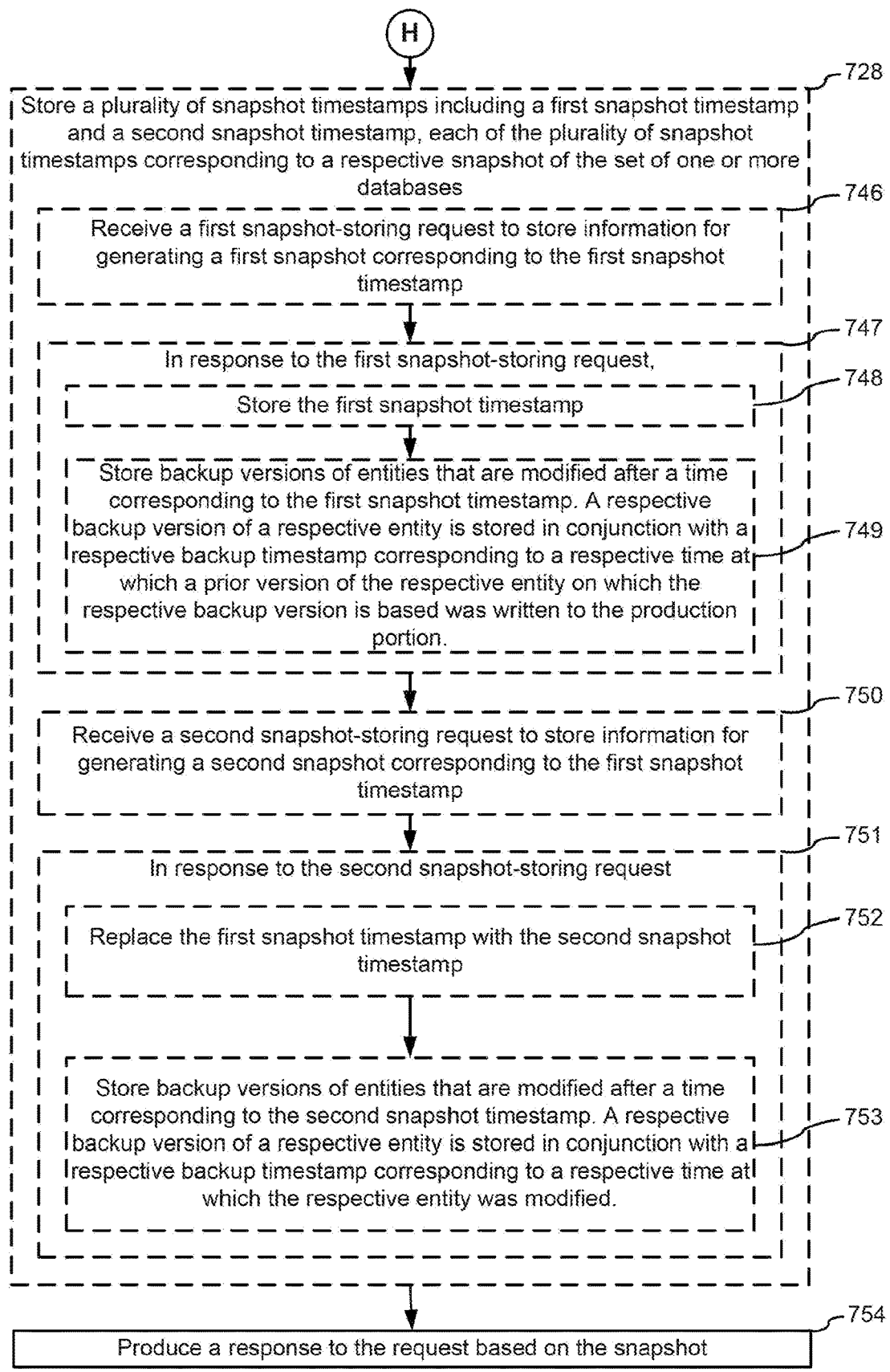

FIG. 6 includes a flowchart representing a method 600 for storing backup data and creating a consistent database snapshot using the backup data, in accordance with some embodiments. Method 600 is, optionally, governed by instructions that are stored in a non-transitory computer readable storage medium and that are interpreted or executed by one or more processors of one or more computer systems (e.g., Client 102 in FIG. 2, Application Server 104 in FIG. 3 or Datastore Server 106 in FIG. 4). In some embodiments, an operation shown in FIG. 6 corresponds to instructions stored in a computer memory or non-transitory computer readable storage medium (e.g., memory 206 of Client 102 in FIG. 2, memory 306 of Application Server 104 in FIG. 3, or memory 406 of Datastore Server 106 in FIG. 4). In some implementations, the non-transitory computer readable storage medium includes a magnetic or optical disk storage device, solid state storage devices such as Flash memory, or other non-volatile memory device or devices. In some implementations, the non-transitory computer readable instructions stored on the computer readable storage medium include one or more of: source code, assembly language code, object code, or other instruction format that is interpreted or executed by one or more processors. In various embodiments, some operations in method 600 are combined and/or the order of some operations is changed from the order shown in FIG. 6.

In some embodiments, Database Server 106 stores (602) a plurality of entities in the one or more databases, which include a backup portion (e.g., Backup Data 136A) and a production portion (e.g., Production Data 138A). In some embodiments, the one or more databases are stored across multiple Datastore Servers 106. For example, the backup portion and production portion can include entities stored in a plurality of different Datastore Servers 106. In other embodiments, multiple replicas of the production portion and backup portion are stored on different Datastore Servers (e.g., Datastore Server 106A . . . Datastore Server 106N, etc.)

Before a predefined snapshot time, a requestor (e.g., Client 102 or Application Server 104) sends (604) a request to store a database snapshot corresponding to the predefined snapshot time to Datastore Server 106. Also before the predefined snapshot time, Datastore Server 106 stores (606) a snapshot timestamp corresponding to the predefined snapshot time. In some embodiments, where the one or more databases are stored across a plurality of Datastore Servers 106, after storing the snapshot timestamp, Datastore Server 106 optionally distributes (608) the predefined snapshot time to one or more other Datastore Servers in the plurality of Datastore Servers 106 in a distributed server system, so as to coordinate storing backup versions of entities for the database snapshot across the plurality of Datastore Servers 106.

After the predefined snapshot time, Datastore Server 106 receives (610) a request to modify a respective entity stored at Datastore Server 106. In response to the request to modify the respective entity, Datastore Server 106 stores (612) a backup version of the respective entity in the backup portion and modifies the respective entity in the production portion.

Also after the predefined snapshot time, the requestor (e.g., Client 102 or Application Server 104) sends (614), to Datastore Server 106, a request for a database snapshot at the predefined snapshot time. Datastore Server 106 receives (616) from the requestor the request for database snapshot at the predefined snapshot time. In some embodiments, Datastore Server 106 delays (618) generating the database snapshot until an amount of time that has elapsed since the snapshot time is great than a safe age. In some implementations, the delay is introduced by Datastore Server 106 because there are or may be pending (committed, but not yet applied) read, write, or delete operations involving entities associated with the database snapshot, and the application of these pending operations takes a finite amount of time. Thus, in some embodiments the safe age indicates a particular point in time at which read, write, or delete operations that would affect entity values in the database snapshot have been (or will have been) applied. In other embodiments, the safe age corresponds to a length of time, for example, five milliseconds or one minute by which point any operations pending at the predefined snapshot time will have been applied to the datastore. In other words, if the database snapshot corresponding to the snapshot time has not reached the safe age, Datastore Server 106 delays generating the database snapshot. If the safe age is reached, in some embodiments, Datastore Server 106 generates (620) the database snapshot using backup versions stored in the backup portion(s) and current versions stored the production portion.

In some embodiments, after the database snapshot is generated, Datastore Server 106 produces (622) a response based on the database snapshot, and transmits the response to the requestor (e.g., Client 102 or Application Server 104). In some embodiments, the response includes a portion of the database snapshot. In other embodiments, the response includes the complete database snapshot. After submitting the request to Datastore Server 106 and optionally waiting for a delay based on the safe age, the requestor (e.g., Client 102 or Application Server 104) receives (624) the response transmitted by Datastore Server 106.

It should be understood that the particular order in which the operations in FIG. 6 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 700 (described herein with reference to FIGS. 7A-7I) are also applicable in an analogous manner to method 600 described above with respect to FIG. 6. For example, in some implementations, the database snapshot, timestamp, request to store a database snapshot, request for a database snapshot, production portion, and backup portion, described above with reference to method 600 have one or more of the characteristics of the database snapshot, timestamp, request to store a database snapshot, request for a database snapshot, production portion, and backup portion, described herein with reference to method 700. For brevity, these details are not repeated here.

FIGS. 7A-7I include a flowchart representing a method 700 for storing backup data and creating a consistent snapshot at a server system using the backup data, in accordance with some embodiments. Method 700 is, optionally, governed by instructions that are stored in a non-transitory computer readable storage medium and that are interpreted or executed by one or more processors of one or more servers (e.g., Application Server 104 in FIG. 3, Datastore Server 106 in FIG. 4). In some implementations, each of the operations shown in FIGS. 7A-7I corresponds to instructions stored in a computer memory or non-transitory computer readable storage medium (e.g., memory 306 of Application Server 104 in FIG. 3, or memory 406 of Datastore Server 106 in FIG. 4). In some implementations, the non-transitory computer readable storage medium includes a magnetic or optical disk storage device, solid state storage devices such as Flash memory, or other non-volatile memory device or devices. In some implementations, the computer readable instructions stored on the computer readable storage medium include one or more of: source code, assembly language code, object code, or other instruction format that is interpreted or executed by one or more processors. In various embodiments, some operations in method 700 are combined and/or the order of some operations is changed from the order shown in FIGS. 7A-7I.

A plurality of entities is stored (701) in a set of one or more databases. In some embodiments, the set of one or more databases includes a production portion for storing current versions of entities (e.g., Production Portion 508 in FIGS. 5A-5E), and a backup portion for storing backup versions for modified entities (e.g., one of Backup Portions 502, 504, 506, 516, 518, 520, 524, 528, 532 in FIGS. 5A-5E). In some embodiments, the backup portion contains data items stored in the same one or more databases but distinguished from data items in the production portion of the one or more databases by metadata, such as by having a different kind from other entities (e.g., Kind=backup). In other words, in some implementations, backup versions and current versions are stored in the same database, but distinguishable by metadata. In some embodiments, the set of one or more databases is stored across multiple Datastore Servers 106. In other embodiments, the backup portion, or the production portion, or both are stored across multiple Datastore Servers 106. In some embodiments, the multiple backup versions of the same entity are stored in different backup portions. For example, in FIG. 5A, while both A1 and A2 are backup versions of entity A, A1 is stored in Backup Portion 502, while backup version A2 is stored in Backup Portion 506. Alternatively, in other embodiments, backup versions of a same entity are stored in a same backup portion. For example, in FIG. 5C, A1 and A2 are backup versions of entity A and are both stored in Backup Portion 524.

In some embodiments, prior to the predefined snapshot time, Datastore Server 106 receives (702) a request to store a snapshot (e.g., a database snapshot) from either Client 102 or another server. In some embodiments, Datastore Server 106 generates (703) a snapshot timestamp corresponding to the snapshot time. In some embodiments, where the set of one or more databases are distributed over a set of Datastore Servers 106, one Datastore Server 106 distributes (704) the snapshot timestamp to one or more other Datastore Servers 106. In some embodiments, Datastore Servers 106 ensures that the time interval between when the snapshot timestamp is generated (the snapshot-generation time) and the time when the snapshot is to be stored (the snapshot timestamp) is greater than an amount of time required to distribute the snapshot timestamp to one or more other servers. In other words, in some embodiments, because backup versions are only selectively stored when a current version is overwritten (e.g., some versions of entities are overwritten without storing a backup version if there is no snapshot that needs the version of the entity), after receiving a request to store a snapshot, a server generates a snapshot timestamp on its own, and the snapshot timestamp is generated in such a manner that, it can be distributed to and received by the relevant servers, so that backup versions relevant to the snapshot are stored, despite potential delays in distributing the timestamp, such as network latency.

Alternatively, in other embodiments, where the set of one or more databases is distributed over a set of database servers, Datastore Server 106 receives (705), from another server, such as Datastore Server 106N, a snapshot timestamp corresponding to a predefined snapshot time. The snapshot time was generated by the other server in response to a request to store snapshot, previously received by that server. In other words, in some embodiments, a server receives snapshot timestamps created and sent by another server.

In some embodiments, whether Datastore Server 106 generated the snapshot timestamp or not, before the snapshot time, Datastore Server 106 stores (706) the snapshot timestamp corresponding to the snapshot time. After the snapshot time, Datastore Server 106 receives (707) a request to modify a respective entity stored at a respective server. In response to the request to modify the respective entity (708), Datastore Server 106 stores (709) a backup version of the respective entity in the backup portion, and modifies (710) the respective entity in the production portion. In some embodiments, the backup version is additionally stored with a backup timestamp that corresponds to the time at which the backup version was created. For example, in FIG. 5A, entity B is modified at time T5, causing its production value to change from B2 to B3. Because past version B2 represents the value of entity B at time=STS2, B2 is stored as a backup version, and B3 is stored as the current version. In contrast, although B1 is a past version of entity B, B1 was not stored as a backup version, because at the time that B1 was replaced with B2, there was no snapshot timestamp corresponding to a snapshot of B that corresponded to a time between T2 and T3. As such, in this example, B1 was overwritten with B2 without storing B1 as a backup version.

After the snapshot time, Datastore Server 106 receives (711) a request for a snapshot of at least a portion of the set of one or more databases at the snapshot time. In some embodiments, prior to generating the snapshot (712), Datastore Server 106 first stores (713) a safe age. As explained above, with reference to FIG. 6, in some embodiments, the safe age corresponds to a predefined length of time; alternatively, in other embodiments, the safe age indicates a point in time after which pending (committed, but not yet applied) read, write, or delete operations involving the entities associated with the snapshot are applied.

In some embodiments, after storing the safe age, Datastore Server 106, in accordance with a determination that the amount of time that has elapsed since the snapshot time is less than the safe age, delays generating the snapshot, until the amount of time that has elapsed since the snapshot time is great than the safe age. In other words, prior to generating the snapshot, Datastore Server 106 first determines whether the snapshot corresponding to the snapshot time has reached the safe age (714). If the snapshot corresponding to the snapshot time has not reached the safe age ("No") (715), Datastore Server 106 delays generating the snapshot. If the snapshot corresponding to the snapshot time has reached the safe age ("Yes") (716), Datastore Server 106 generates a snapshot using backup versions of the entities from the backup portion and current versions of entities from the production portion. Delaying generating a snapshot until the snapshot is older than the safe age guarantees that pending entity changes that will have timestamps earlier than the snapshot time are applied before the snapshot is generated. Using a safe age in this way improves data integrity and consistency by ensuring that the backup versions of entities that will be used to generate a snapshot are been stored in a backup portion prior to generating the snapshot. Alternatively, in other embodiments, in response to the request for the snapshot, Datastore Server 106 begins to generate the snapshot immediately (e.g., where data integrity and consistency are less important than producing snapshots without additional delays).

In response to the request for the snapshot, Datastore Server 106 generates (717) a snapshot that includes a backup version of a first entity retrieved from the backup portion; and a current version of a second entity retrieved from the production portion. Therefore, in some embodiments, production versions are used to generate a snapshot. As such, in these embodiments, as those shown in FIGS. 5A-5E, a snapshot can be generated using current versions of entities (which are already stored in the production portion) without storing these current versions again in a backup portion, thereby reducing data redundancy. For example, in some situations, for a respective entity that has not changed recently, the same current version of the respective entity that is stored in the production portion will be used to generate multiple different snapshots having timestamps that correspond to times after the last time that the respective entity was modified.

In some implementations or circumstances, the first entity is created (718) prior to the snapshot time and modified after the snapshot time. In other words, there is a now current version of the first entity in the production portion that is different from the backup version of the first entity. For example, as shown in FIG. 5A, backup version A1 was created and modified after time=STS1. In some circumstances, the second entity is created (719) prior to the snapshot time and not been modified since the snapshot time. Thus, in the aforementioned circumstances, the second entity represents a current version stored in the production portion, which was last modified (or created) before the time indicated in the snapshot timestamp, but has not since been modified. For example, as shown in FIG. 5A, current version F2 was created before time=STS1 and has not been modified since STS1. In some implementations, there are one or more backup versions of the second entity and the current version of the second entity in the production portion of the database is still the same as the version of the second entity that was "current" as of the snapshot time. For example, in FIG. 5A, there are two versions of entity D: D5 and D6. The current version of entity D, D6 was modified before STS2 but has not since been modified, and is still the current version of entity D at time T5.

In some embodiments, the snapshot corresponds to a predefined range of entities in the set of one or more databases. For example, in some embodiments, a request to generate the snapshot includes information specifying the predefined range of entities to include in the snapshot. In other words, in some embodiments, one or more filters are applied in a request to store a snapshot, to store some, but not all, entities in a snapshot. "Filters" used to identify ranges of entities can be applied according to numeric values or by timestamps associated with the entities. For example, the requestor could request a snapshot of entities A and B but not entities C-F. As another example, the requestor could request a snapshot of entities corresponding to a user profile (e.g., a backup of a contact list) but not other entities. In situations where a database stores data for multiple users and/or multiple applications, the range of entities could be restricted to entities corresponding to a particular user or a particular application (e.g., a user requests a backup of all of their data for a particular application). Enabling the snapshot to be restricted to a predefined range of data provides the requestor with the opportunity to request snapshots of the most relevant data while indicating other data that does not need to be backed up, thereby saving storage capacity and processing resources that would otherwise be expended backing up the data. Alternatively, in other embodiments, the snapshot includes all existing entities in the set of one or more databases.

In some embodiments, the snapshot generated by Datastore Server 106 includes (720) data for multiple entities, including data from the backup portion for entities last modified after the snapshot time, and data from the production portion for entities last modified before the snapshot time. In other words, in some implementations, generating the snapshot takes a finite amount of time, during which further changes to the set of one or more databases, in particular, to the current versions in the production portion, are made. Therefore, in some implementations, values of some entities that are current at the time indicated in the snapshot timestamp are modified, and overwritten with a new current version, while the snapshot is being generated. However, to generate a consistent snapshot, values that were current versions at the time indicated in a snapshot timestamp are included in the snapshot rather than the new current versions. This approach takes into account situations where entities are modified while the snapshot is still being generated, and ensures that the correct versions are includes, thereby producing a consistent snapshot.

In some embodiments, an entity in the production portion is associated with a last modification timestamp, which corresponds to a time at which the respective entity was last modified. In other words, the last modification stamp corresponds to a time at which the current version begins to exist in the production portion. For example, in FIG. 5A, {A3, T5} indicates that the current version of A began to exists in the production portion at time T5, while {D6, T2} indicates that the current version of D began to exists in the production portion at time T2. In some embodiments, generating (721) the snapshot includes excluding, from the snapshot, entities from the production portion that have a last-modification timestamp corresponding to a time after the snapshot time. For example, in FIG. 5A, in order to generate Snapshot 2, current versions {A3, T5}, {B3, T5}, {C3, T5}, and {E7, T5} are excluded from Snapshot 2 because their respective last modification timestamp indicates a time after the snapshot time STS2 (e.g., STS2<T5).

In some embodiments, processing the request for a snapshot takes a finite amount of time and while still processing the request for snapshot (e.g., during the finite amount of time), Datastore Server 106 receives (722) a request to modify a third entity that was last modified prior to the snapshot time. In response to the request to modify the third entity (723), Datastore Server 106 stores (724) a backup version of the third entity in the backup portion, and modifies (725) the third entity in the production portion. In some embodiments, the backup version of the third entity is additionally associated with a backup timestamp which corresponds to the time at which the backup version was created. In some embodiments, the snapshot generated includes (726) the backup version of the third entity. In other words, in some embodiments, current versions of entities are modified while a snapshot is still being generated, (e.g., backup versions are created and stored in the backup portion while the snapshot is still being generated). Therefore, in some embodiments, to ensure the correct snapshots are produced, the last modification timestamp of the current versions in the production portion are first examined (also called scanned), and current versions whose last modification timestamps are after the snapshot timestamp are excluded from the snapshot. In some embodiments, after current versions are examined, timestamps of the backup versions are also examined to ensure that backup versions, which were current versions as of the snapshot time, are included in the snapshot. In some embodiments, this process is accomplished by retrieving current versions and backup versions in a deliberate sequence, for example, first retrieving a current version from the production portion and then retrieving backup versions stored in backup portion(s). The deliberate sequence ensures that backup versions representing values of entities at the time indicated in the snapshot timestamp are included in the snapshot, even if they were stored in the backup portion while the snapshot was being generated.

In some embodiments, modifications to relevant entities occur while processing the request for snapshot. In some embodiments, the backup version of the first entity was stored prior to processing the request for the snapshot, and the snapshot includes (727) backup version of a third entity that was modified while processing the request for the snapshot. In other words, in some situations, because generating the snapshot takes a finite amount of time, entities, relevant to the snapshot, are modified while the snapshot is still being generated. As a result, the snapshot includes both backup versions that were already stored in the backup portion prior to the snapshot time, and backup versions that were current versions at the time that the request to retrieve the snapshot was received, but became backup versions during the finite amount of time during which the snapshot was being generated.

In some embodiments, multiple different snapshots are generated. In some embodiments, Datastore Server 106 stores (728) a plurality of snapshot timestamps, including a first snapshot timestamp and a second snapshot timestamp that is different from the first snapshot timestamp. For example, in FIG. 5A, timestamps for Snapshot 1 (time=STS 1) and Snapshot 2 (time=STS 2) are both stored. Each of the plurality of the snapshot timestamps corresponds to a respective snapshot of the set of one or more databases.

In some implementations or circumstances, different snapshots include overlapping ranges of data. In some embodiments, the first snapshot timestamp corresponds (729) to a first snapshot of a first set of entities—for example, entities having values for a predefined property in a first range of values—and the second snapshot timestamp corresponds to a second snapshot of a second set of entities—for example, entities having values for the predefined property in a second range of values. In some implementations or circumstances, the first set of entities and the second set of entities share one or more common entities, and for at least a respective common entity of the one or more entities, both the first snapshot and the second snapshot include a same backup version of the respective common entity. In other words, in some implementations, while the first and second snapshots both include a set of entities, both the first set and the second sets includes not only a same entity, but also a same backup version of the same entity, e.g., the first and second snapshot overlap by having the same backup version of the same entity in both snapshots. For example, a user could request a snapshot of entities A-D at STS2 and a snapshot of entities C-F at STS3. In this example, entities C and D are in both ranges of entities and in situations where backup versions of entities are shared in one or more backup portions (e.g., as illustrated in FIGS. 5B-5E) both of the snapshots could use the same backup version of C (e.g., C2) to generate snapshots of the ranges of entities in the database.

In some embodiments, the backup portion of the set of one or more databases includes (730) a first backup portion corresponding to the first snapshot timestamp, and a second backup portion corresponding to the second snapshot timestamp. In some embodiments, generating (731) a first snapshot corresponding to the first snapshot timestamp includes retrieving: a backup version of an entity from the first backup portion, and a current version of a different entity from the production portion. In some embodiments, generating (732) a second snapshot corresponding to the second snapshot timestamp includes retrieving: a backup version of an entity from the second backup portion, and a current version of a different entity from the production portion. In other words, in some implementations, one backup portion alone includes necessary data (e.g., necessary backup versions of database enteritis) to generate a particular snapshot; backup versions stored in different backup portions of the one or more databases are used to generate different snapshots. For example, in FIG. 5A, there are three independent backup portions. When generating Snapshot 2, only backup versions stored in Backup Portion 504 are needed. In order to generate Snapshot 3, only backup versions stored in Backup Portion 506 would be needed. This approach allows independence or self-sufficiency among several backup portions, because removing one backup portion does not affect generating snapshots corresponding to other backup portions.

In some implementations, the backup portion includes (733) a first backup portion corresponding to the first snapshot timestamp and a second backup portion corresponding to the second snapshot timestamp. In some implementations, generating (734) a first snapshot corresponding to the first snapshot timestamp includes retrieving: a backup version of an entity from the first backup portion, a backup version of an entity from the second backup portion, and a current version of a different entity from the production portion. In other words, in some implementations, backup versions from multiple backup portions are used to generate a single snapshot. In these situations, Datastore Server 106 does not need to store, in one backup portion, entities previously stored in another backup portion that were not modified between the time corresponding to the first timestamp and the time corresponding to the second timestamp. For example, in FIG. 5B, in order to generate Snapshot 2 514, backup versions of B, C and E (e.g., B2, C2 and E5, respectively) are retrieved from Backup Portion 518, while backup versions of A and D (e.g., A1 and D5, respectively) are retrieved from Backup Portion 516. Using this approach, snapshots can share backup versions stored in several backup portions, thus a backup version only needs to be stored once in one backup portion, rather than being duplicated in multiple backup portions. As a result, data redundancy is reduced, conserving storage space at Datastore 106.

In some embodiments, the backup portion includes (735) a plurality of backup versions of a respective entity, including: a first backup version of the respective entity stored with a first backup timestamp before the first snapshot timestamp, and a second backup version of the respective entity stored with a second backup timestamp after the first backup timestamps and before the second snapshot timestamp. In some embodiments, a backup timestamp corresponds to the time at which a backup version was last modified, e.g., the time at which the backup version was overwritten in the production portion and saved in the backup portion. In some implementations, generating a first snapshot corresponding to the first snapshot timestamp includes retrieving (736) the first backup version of the respective entity from the backup portion in accordance with the first backup timestamp and a current version of a different entity from the production portion. In some of these embodiments, generating a second snapshot corresponding to the second snapshot timestamp includes retrieving (737) the second backup version of the respective entity from the backup portion in accordance with the second backup timestamp and a current version of a different entity from the production portion. In other words, in some embodiments, backup versions used to generate different snapshots are stored in a same backup portion, but are differentiated from each other by their backup timestamps. For example, as shown in FIG. 5C, backup versions are stored in one single backup portion; a backup version is additionally stored with a backup timestamp. In order to generating Snapshot 2, backup versions A1 and A2 are both examined, but only A1 is selected because A1's backup timestamp indicates a time before STS2, the timestamp of Snapshot 2. However, in order to generate a snapshot at STS3, backup version A2 would be selected over A1 because, A2's backup timestamp indicates a time before STS3 but later than A1's backup timestamp. Backup values for other entities could also be selected for inclusion in a snapshot in a similar manner, as described in greater detail above with reference to FIG. 5C.

In some embodiments, a garbage collection process is implemented to remove, from the backup portion, backup versions that are no longer needed to generate any snapshots. In some embodiments, after receiving (738) a communication indicting that a respective snapshot does not need to be stored, Datastore Server 106 identifies one or more backup versions for deletion, the one or more identified backup versions including a respective backup version that was needed only for generating the respective snapshot. In some implementations, a plurality of respective backup versions are each stored with: a respective backup timestamp corresponding to a respective time at which a prior version of a corresponding entity on which the respective backup version is based was written to the production portion; and a respective garbage-collection timestamp corresponding to a respective time at which a version of the corresponding entity that replaced the prior version of the corresponding entity was written to the production portion. In some implementations, identifying (739) a backup version of deletion includes a determination that there are no snapshot timestamps that fall between the respective backup timestamp and the respective garbage-collection timestamp for the identified backup version. For example, as shown in FIG. 5D, after receiving a communication indicating that Snapshot 2 no longer needs to be stored, previously stored backup versions (e.g., A1, A2, B2, C1, C2, D5, E3, E5 and E6) are examined, and E5 is identified for deletion after determining that no other snapshot timestamps fall between E5's backup timestamp (T3) and E5's garbage-collection timestamp (T4). In contrast, A1 A2, B2, C1, C2, D5, E3 and E6 are not identified for deletion because at least one snapshot timestamp (e.g., STS1 or STS3) still falls between respective backup and garbage-collection timestamps for A1, A2, B2, C1, C2, D5, E3 and E6.

In some embodiments, the backup portion of the set of one or more databases includes (740) a plurality of backup versions of entities, each backup version of the plurality of backup versions being stored with one or more snapshot identifiers; a respective snapshot identifier indicates that a corresponding backup version is usable to generate a snapshot corresponding to the respective snapshot identifier, and a backup version of a respective entity is stored with a plurality of snapshot identifiers, including a first snapshot identifier corresponding to the first snapshot timestamp and a second snapshot identifier corresponding to the second snapshot timestamp. In some embodiments, generating (741) a first snapshot corresponding to the first snapshot timestamp includes: selecting a first plurality of backup versions from the backup portion that are determined to be associated with the first snapshot identifier, the first plurality of backup versions including the backup version of the respective entity, and retrieving a current version of a different entity from the production portion. In some embodiments, generating a second snapshot corresponding to the second snapshot timestamp includes (742): selecting a second plurality of backup versions from the backup portion that are determined to be associated with the second snapshot identifier, the second plurality of backup versions including the backup version of the respective entity, and retrieving a current version of a different entity from the production portion. In the example shown in FIG. 5E, in order to generate Snapshot 2, backup versions—A1, B2, C2, and E5—selected from the backup portion because these backup version are stored with the snapshot identifier S2-ID, which indicates these backup version are part of Snapshot 2. In the example shown in FIG. 5E, in order to generate a snapshot for STS3, backup versions—A2, B2, C2 and E6—are selected, because these backup versions are stored with snapshot identifier S3-ID, which indicates that these backup versions are part of a snapshot corresponding to STS3.

In some embodiments, a snapshot identifier is removed when a snapshot corresponding to the snapshot identifier no longer needs to be stored. In some embodiments, after receiving (743) a communication indicating that the first snapshot does not need to be stored, Datastore Server 106 removes (744) the first snapshot identifier corresponding to the first snapshot from a plurality of backup versions in the backup portion. In some embodiments, a garbage collection process using snapshot identifiers is invoked to remove backup versions from backup versions. In some implementations, after removing the first snapshot identifier from a respective backup version in the backup portion, in accordance with a determination that there are no snapshot identifiers stored with the respective backup version, Datastore Server 106 removes (745) the respective backup version from the backup portion. In the example shown in FIG. 5E, after receiving a communication indicating that Snapshot 2 no longer needs to be stored, backup versions in the backup portion are examined. Backup versions A1, B2, C2, and E5 are identified as associated with Snapshot 2. As a result, respective snapshot identifier S2-ID is removed from these backup versions. After snapshot identifier S2-ID is removed, E5 is identified for deletion, because E5 is no longer stored with any snapshot identifier. Backup versions A1, A2, B2, C1, C2, D5, E3 and E6 are not identified for deletion, after removing S2-ID, because these backup versions are still stored with other snapshot identifiers (e.g., S1-ID or S3-ID), as described in greater detail above with reference to FIG. 5E.

In some embodiments, Datastore Server 106 only stores the most recent snapshot timestamp. In some embodiments, Datastore Server 106 receives (746) a first snapshot-storing request to store information for generating a first snapshot corresponding to the first snapshot timestamp. In response to the first snapshot-storing request (747), Datastore Server 106 stores (748) the first snapshot timestamp, and backup versions (749) of entities that are modified after a time corresponding to the first snapshot timestamp. In addition, a respective backup version of a respective entity is stored in conjunction with a respective backup timestamp corresponding to the time at which a prior version of the respective entity was written to the production portion. For example, as shown in FIG. 5D, backup versions of entities are stored in Backup Portion 528 with a backup timestamp indicating when the current version on which the backup version is based was created in the production portion and a garbage-collection timestamp indicating when the current version on which the backup version is based was replaced in the production portion. Thus, in this embodiment, only the current snapshot timestamp needs to be stored, as a requestor can provide a snapshot timestamp, which Server System 106 compares with the backup timestamp and garbage-collection timestamps for the backup versions in Backup Portion 528 to determine which backup versions to include in the requested snapshot, as described in greater detail above with reference to FIG. 5D.

In some embodiments, Datastore Server 106 receives (750) a second snapshot-storing request to store information for generating a second snapshot corresponding to the first snapshot timestamp. In response to the second snapshot-storing request (751), Datastore Server 106 replaces (752) the first snapshot timestamp with the second snapshot timestamp, and stores (753) backup versions of entities that are modified after a time corresponding to the second snapshot timestamp. In addition, a respective backup version of a respective entity is stored in conjunction with a backup timestamp corresponding to the time at which the respective entity was modified. In other words, in some implementations, while Datastore Sever 106 receives a series of requests for storing snapshots and their associated snapshot timestamps, the most recently received snapshot timestamp replaces previously received snapshot timestamps. In some embodiments, incoming snapshot timestamps are stored in a same location in the set of one or more databases after they are received; however, not all timestamps are stored. Instead, the most recently received snapshot timestamp overwrites the snapshot timestamp that was previously stored in that location. In some embodiments, the location where the most recently received snapshot timestamp is stored stores the most recently received snapshot timestamp, which corresponds to a time before the current time.

In some implementations, the most recent timestamp is generated by a function such as NOW( ). In other words, a requestor or user can request that a snapshot be stored without specifying a particular snapshot time and instead, simply request that Server System 106 begin storing backup versions for a snapshot as soon as possible (e.g., NOW( ) plus a delay time period corresponding to the time it will take to distribute the snapshot timestamp to any other datastore server systems that are needed to store backup versions for the snapshot). In some embodiments, such as those shown in FIGS. 5C-5E, when backup versions are not stored in backup portion(s) that corresponds to a particular snapshot timestamp, snapshots are generated using the same or a similar process to those described above with reference to FIGS. 5C-5E, namely, using the backup version of the entities and their corresponding backup timestamps or snapshot identifiers to select the appropriate backup versions to generate a requested snapshot.

In some embodiments, after generating one or more snapshots in response to the request from the requestor (e.g., Client 102 or Application Server 104), Datastore Server 106 produces (754) a response to the request based on the one or more snapshots generated. In some embodiments, the response includes, in addition to the backup versions and current versions corresponding to the one or more snapshots, metadata about these versions and/or formatting information necessary to display the one or more snapshots at the requestor (e.g., Client 102 or Application Server 104). In some embodiments, after receiving the one or more snapshots, the requestor displays representations of the one or more snapshots in Client Application 112 or Web Page 214.

It should be understood that the particular order in which the operations in FIGS. 7A-7I have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 600 (described herein with reference to FIG. 6) are also applicable in an analogous manner to method 700 described above with respect to FIGS. 7A-7I. For example, the snapshot, timestamp, request to store a snapshot, request for a snapshot, production portion, and backup portion, described herein with reference to method 700 have one or more of the characteristics of the snapshot, timestamp, request to store a snapshot, request for a snapshot, production portion, and backup portion, described herein with reference to method 600. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method comprising:
receiving, by one or more processors, a request for a snapshot of data stored in one or more databases, the request having a snapshot time;
determining, by the one or more processors, that an amount of time that has elapsed since the snapshot time is less than a safe age;
delaying, by the one or more processors, generation of the snapshot until the amount of time that has elapsed since the snapshot time is greater than the safe age; and
generating, by the one or more processors, the snapshot.

2. The method of claim 1, further comprising storing, by the one or more processors, a plurality of entities in a set of one or more databases, the set of one or more databases including a production portion for storing current versions of entities and a backup portion for storing backup versions of modified entities.

3. The method of claim 2, further comprising:
receiving, by the one or more processors, a request to modify a respective entity, wherein the respective entity was last modified prior to the snapshot time; and
in response to the request to modify the respective entity:
storing, by the one or more processors, a backup version of the respective entity in the backup portion of the set of one or more databases; and
modifying, by the one or more processors, the respective entity in the production portion of the set of one or more databases.

4. The method of claim 2, wherein the snapshot comprises data from the backup portion but not the production portion for entities last modified after the snapshot time, and data from the production portion but not the backup portion for entities last modified before the snapshot time.

5. The method of claim 2, further comprising:
receiving, by the one or more processors, a request to modify a second entity that was last modified prior to the snapshot time; and
in response to the request to modify the second entity:
storing, by the one or more processors, a backup version of the second entity in the backup portion of the set of one or more databases; and
modifying, by the one or more processors, the second entity in the production portion of the set of one or more databases.

6. The method of claim 5, wherein:
a backup version of a first entity is stored prior to processing the request for the snapshot; and
the snapshot comprises the backup version of the second entity that is modified while processing the request for the snapshot.

7. The method of claim 1, further comprising receiving, by the one or more processors, a snapshot timestamp corresponding to the snapshot time.

8. The method of claim 1, further comprising:
receiving, by the one or more processors, a request to store the snapshot; and
storing, by the one or more processors, the snapshot.

9. A system comprising one or more processors configured to:
receive a request for a snapshot of data stored in one or more databases, the request having a snapshot time;
determine that an amount of time that has elapsed since the snapshot time is less than a safe age;
delay generation of the snapshot until the amount of time that has elapsed since the snapshot time is greater than the safe age; and
generate the snapshot.

10. The system of claim 9, wherein the one or more processors are further configured to store a plurality of entities in a set of one or more databases, the set of one or more databases including a production portion for storing current versions of entities and a backup portion for storing backup versions of modified entities.

11. The system of claim 10, wherein the one or more processors are further configured to:
receive a request to modify a respective entity, wherein the respective entity was last modified prior to the snapshot time; and
in response to the request to modify the respective entity:
store a backup version of the respective entity in the backup portion of the set of one or more databases; and
modify the respective entity in the production portion of the set of one or more databases.

12. The system of claim 10, wherein the snapshot comprises data from the backup portion but not the production portion for entities last modified after the snapshot time, and data from the production portion but not the backup portion for entities last modified before the snapshot time.

13. The system of claim 10, wherein the one or more processors are further configured to:
receive a request to modify a second entity that was last modified prior to the snapshot time; and
in response to the request to modify the second entity:
store a backup version of the second entity in the backup portion of the set of one or more databases; and
modify the second entity in the production portion of the set of one or more databases.

14. The system of claim 13, wherein:
a backup version of a first entity is stored prior to processing the request for the snapshot; and
the snapshot comprises the backup version of the second entity that is modified while processing the request for the snapshot.

15. The system of claim 9, wherein the one or more processors are further configured to receive a snapshot timestamp corresponding to the snapshot time.

16. The system of claim 9, wherein the one or more processors are further configured to:
receive a request to store the snapshot; and
store the snapshot.

17. One or more non-transitory computer readable storage media storing one or more programs, the one or more programs comprising instructions, which when executed by one or more processors, cause the one or more processors to perform operations comprising:
receiving a request for a snapshot of data stored in one or more databases, the request having a snapshot time;
determining that an amount of time that has elapsed since the snapshot time is less than a safe age;
delaying generation of the snapshot until the amount of time that has elapsed since the snapshot time is greater than the safe age; and
generating the snapshot.

18. The one or more non-transitory computer readable storage media of claim 17, wherein the operations further comprise storing a plurality of entities in a set of one or more databases, the set of one or more databases including a production portion for storing current versions of entities and a backup portion for storing backup versions of modified entities.

19. The one or more non-transitory computer readable storage media of claim 17, wherein the operations further comprise receiving a snapshot timestamp corresponding to the snapshot time.

20. The one or more non-transitory computer readable storage media of claim 17, wherein the operations further comprise:
receiving a request to store the snapshot; and
storing the snapshot.

* * * * *